(12) United States Patent
Nemoto et al.

(10) Patent No.: US 7,639,038 B2
(45) Date of Patent: Dec. 29, 2009

(54) TERMINATING RESISTANCE ADJUSTING METHOD, SEMICONDUCTOR INTEGRATED CIRCUIT AND SEMICONDUCTOR DEVICE

(75) Inventors: Yutaka Nemoto, Kawasaki (JP); Yoshimasa Ogawa, Kawasaki (JP); Miki Yanagawa, Kawasaki (JP); Makoto Koga, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 99 days.

(21) Appl. No.: 11/485,396

(22) Filed: Jul. 13, 2006

(65) Prior Publication Data
US 2007/0216441 A1    Sep. 20, 2007

(30) Foreign Application Priority Data
Mar. 20, 2006    (JP)    ............ 2006-076776

(51) Int. Cl.
*H03K 17/16*    (2006.01)
*H03K 19/003*    (2006.01)
(52) U.S. Cl. .................................................. 326/30
(58) Field of Classification Search .............. 326/30
See application file for complete search history.

(56) References Cited
U.S. PATENT DOCUMENTS

2004/0090239 A1 *    5/2004    Ikeoku et al. .............. 326/30
2004/0169525 A1 *    9/2004    Kerr ............................ 326/30
2005/0134304 A1 *    6/2005    Lee ............................. 326/30

FOREIGN PATENT DOCUMENTS

JP    2003-143002 A    5/2003

* cited by examiner

*Primary Examiner*—Vibol Tan
*Assistant Examiner*—Matthew C Tabler
(74) *Attorney, Agent, or Firm*—Arent Fox LLP

(57) ABSTRACT

A terminal resistance adjusting method adjusts a terminating resistance within a semiconductor integrated circuit. The method includes obtaining a comparison result by comparing a reference voltage and a voltage of a first node that is coupled to a first voltage via a current supply circuit, the first voltage being one of a power supply voltage and a ground voltage, controlling a monitoring resistor part which has a plurality of first resistors when making a calibration, so as to selectively couple the first resistors in parallel between the first node and a second voltage based on the comparison result, the second voltage being the other of the power supply voltage and the ground voltage, and controlling a terminating resistor part which has a plurality of second resistors when controlling the terminating resistance of the terminating part, so as to selectively couple the second resistors in parallel between a second node and the second voltage based on the comparison result similarly to the first resistors of the monitoring resistor part.

19 Claims, 45 Drawing Sheets

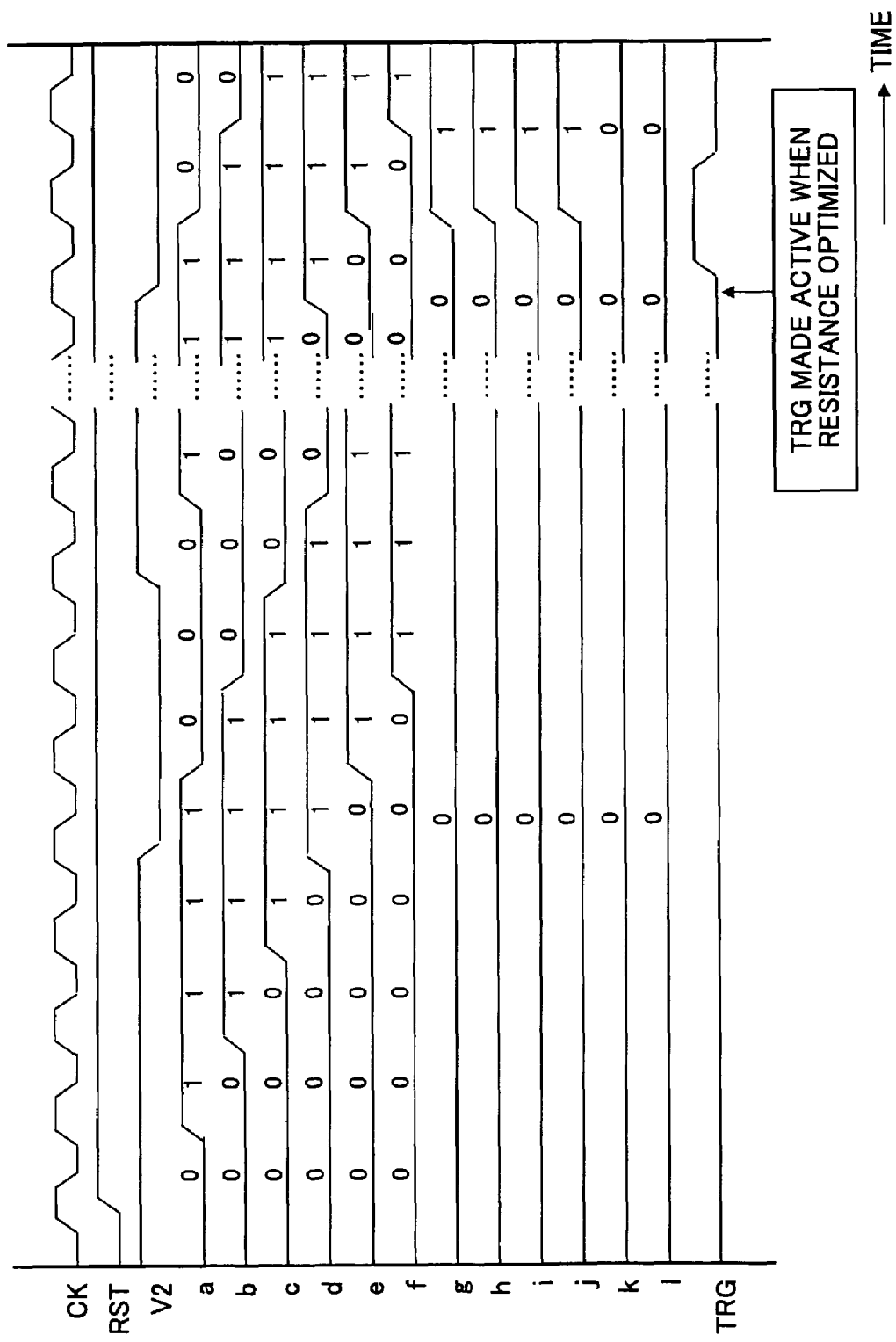

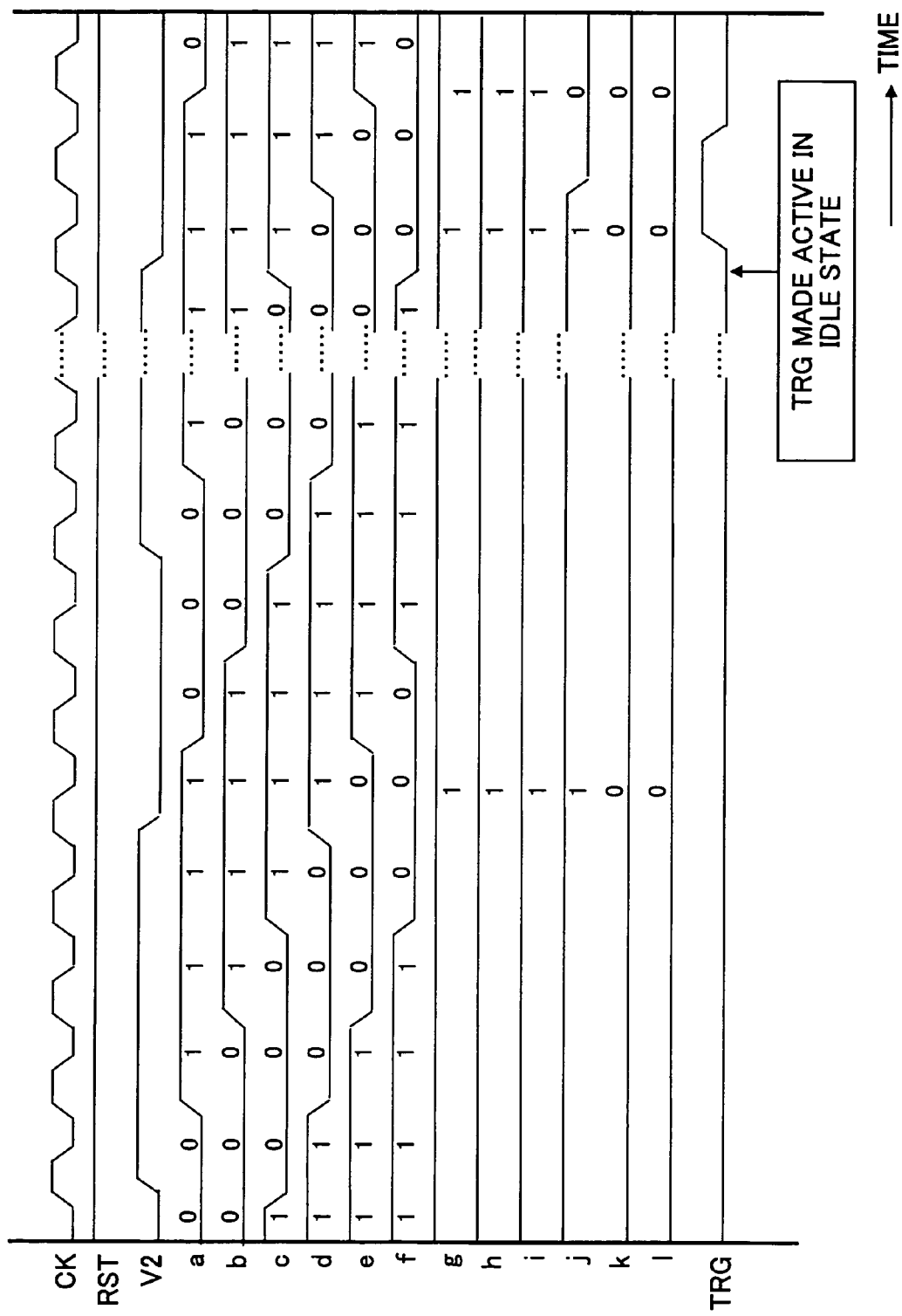

TERMINATING RESISTANCE ADJUSTING METHOD, SEMICONDUCTOR INTEGRATED CIRCUIT AND SEMICONDUCTOR DEVICE

BACKGROUND OF THE INVENTION

1. Field of the Invention

The present invention generally relates to terminating resistance adjusting methods, semiconductor integrated circuits and semiconductor devices, and more particularly to a terminating resistance adjusting method for adjusting a terminating resistor provided within a semiconductor integrated circuit, a semiconductor integrated circuit that employs such a terminating resistance adjusting method, and a semiconductor device having such a semiconductor integrated circuit.

2. Description of the Related Art

FIG. 1 is a diagram for explaining an example of a conventional data transmission system. In FIG. 1, each transmitting and receiving system 1 is provided with a semiconductor device (or a semiconductor chip) 2 having a semiconductor integrated circuit, a terminating resistor 3 and an external terminal 4. The two transmitting and receiving system 1 are connected via a transmission line 5 that connects to the external terminals 4 thereof.

The terminating resistor 3 is provided for impedance matching, as a noise countermeasure, when making a high-speed data transmission in such a data transmission system. Generally, the terminating resistor 3 that is necessary for making the high-speed data transmission via the transmission line 5 is required to have a highly accurate resistance.

However, according to the structure in which the terminating resistor 3 is externally connected to the semiconductor device 2, there was a problem in that the cost of the transmitting and receiving system 1 becomes high. Hence, a Japanese Laid-Open Patent Application No. 2003-143002 proposes a method of providing the terminating resistor within the semiconductor device.

According to the method proposed in the Japanese Laid-Open Patent Application No. 2003-143002, the terminating resistor is used to generate a certain potential when calibrating the terminating resistor within the semiconductor device, and it is necessary to supply a current directly to the transmission line. But since a pull-down resistor is connected in parallel to the transmission line, it is only possible to obtain a calibration result including the pull-down resistor when the calibration is made by supplying the currently directly to the transmission line. Consequently, there was a problem in that an accurate calibration cannot be made.

SUMMARY OF THE INVENTION

Accordingly, it is a general object of the present invention to provide a novel and useful terminating resistance adjusting method, semiconductor integrated circuit and semiconductor device, in which the problems described above are suppressed.

Another and more specific object of the present invention is to provide a terminating resistance adjusting method, a semiconductor integrated circuit and a semiconductor device, which can accurately make a calibration for setting a terminating resistor within a semiconductor device to an optimum resistance.

Still another object of the present invention is to provide a semiconductor integrated circuit comprising a current source circuit coupled between a first node and a first voltage, the first voltage being one of a power supply voltage and a ground voltage; a monitoring resistor part having a plurality of first resistors that are selectively coupled in parallel between the first node and a second voltage, the second voltage being the other of the power supply voltage and the ground voltage; a terminating resistor part having a plurality of second resistors that are selectively coupled in parallel between a second node and the second voltage; a comparator circuit configured to compare a voltage of the first node and a reference voltage to output a comparison result; a control part configured to control the first resistors that are selectively coupled in parallel in the monitoring resistor part based on the comparison result when making a calibration; and an external terminal coupled to the second node, wherein the control part selectively couples the second resistors in parallel in the terminating resistor part similarly to the first resistors of the monitoring resistor part based on the comparison result when controlling a resistance of the terminating resistor part. According to the semiconductor integrated circuit of the present invention, it is possible to accurately make a calibration for setting the terminating resistor to an optimum resistance.

A further object of the present invention is to provide a semiconductor device comprising the semiconductor integrated circuit described above. According to the semiconductor device of the present invention, it is possible to accurately make a calibration for setting the terminating resistor within the semiconductor device to an optimum resistance.

Another object of the present invention is to provide a terminal resistance adjusting method for adjusting a terminating resistance within a semiconductor integrated circuit, comprising a comparing step obtaining a comparison result by comparing a reference voltage and a voltage of a first node that is coupled to a first voltage via a current supply circuit, the first voltage being one of a power supply voltage and a ground voltage; a first control step controlling a monitoring resistor part which has a plurality of first resistors when making a calibration, so as to selectively couple the first resistors in parallel between the first node and a second voltage based on the comparison result, the second voltage being the other of the power supply voltage and the ground voltage; and a second control step controlling a terminating resistor part which has a plurality of second resistors when controlling the terminating resistance of the terminating part, so as to selectively couple the second resistors in parallel between a second node and the second voltage based on the comparison result similarly to the first resistors of the monitoring resistor part. According to the terminating resistance adjusting method of the present invention, it is possible to accurately make a calibration for setting the terminating resistor to an optimum resistance.

Other objects and further features of the present invention will be apparent from the following detailed description when read in conjunction with the accompanying drawings.

BRIEF DESCRIPTION OF THE DRAWINGS

FIG. 9 is a timing chart for explaining the operation of the second embodiment in the initializing state;

FIG. 10 is a timing chart for explaining the operation of the second embodiment in the idle state or a communicating state;

DESCRIPTION OF THE PREFERRED EMBODIMENTS

Operating Principle of Invention

Figure 1:
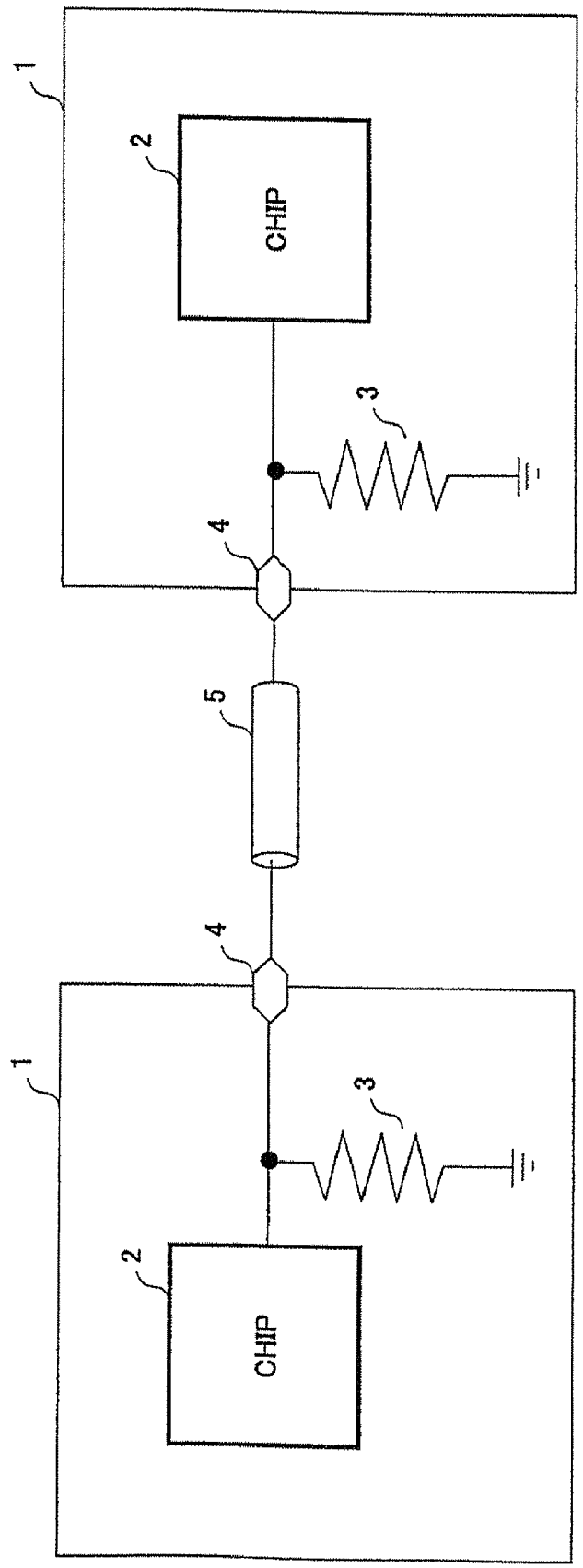
FIG. 1 is a diagram for explaining an example of a conventional data transmission system.
Figure 2:
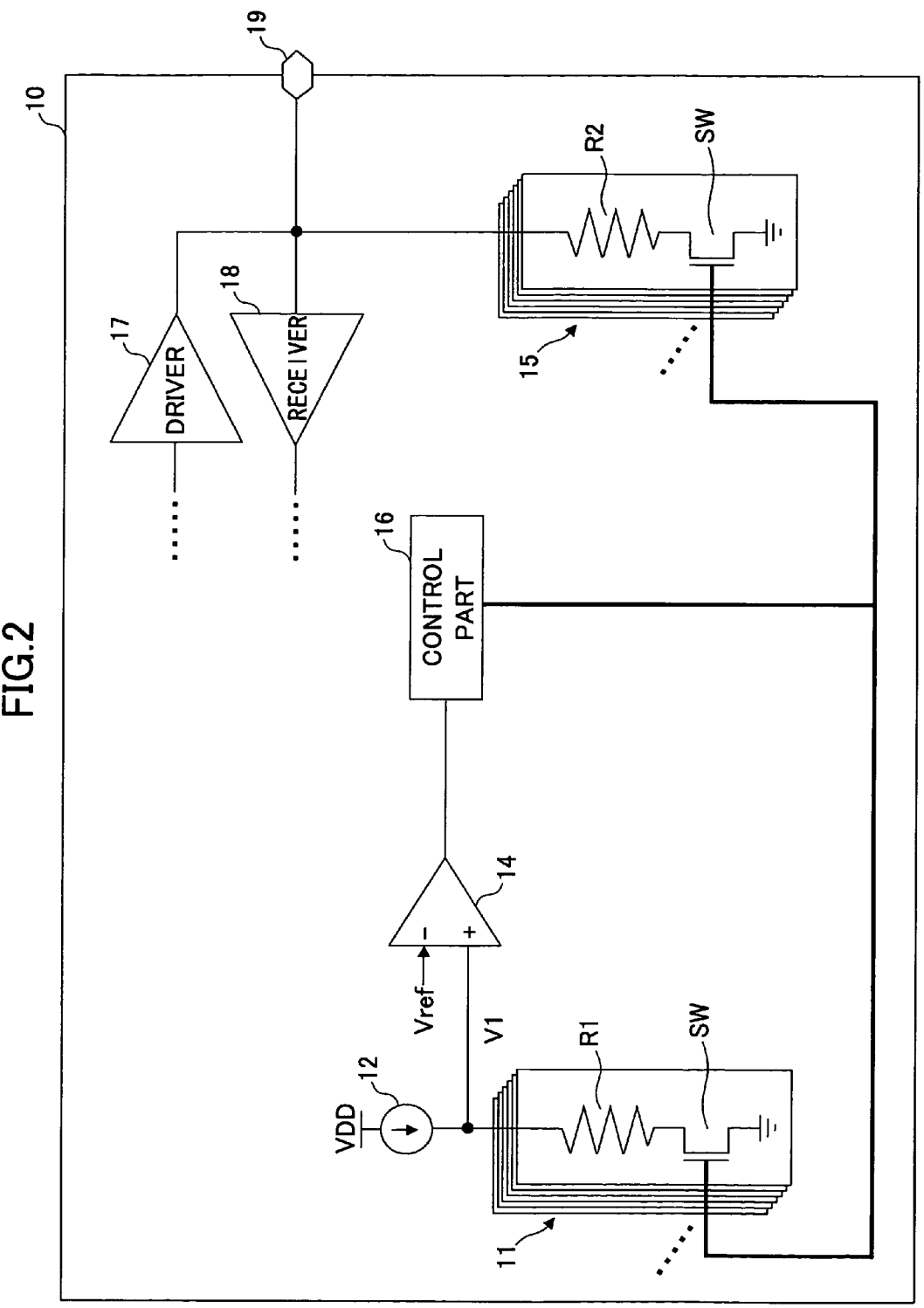
FIG. 2 is a diagram for explaining an operating principle of the present invention.

FIG. 2 is a diagram for explaining an operating principle of the present invention. A transmitting and receiving system 10 shown in FIG. 2 is formed by a semiconductor device (or a semiconductor chip), and includes a monitoring resistor part 11, a current source circuit 12, a comparator circuit 14, a terminating resistor part 15, a control part 16, a driver 17, a receiver 18, and an external terminal 19. In FIG. 2, VDD denotes a power supply voltage. The external terminal 19 is connected to an output of the driver 17 and to an input of the receiver 18. In addition, the terminating resistor part 15 is connected between the external terminal 19 and a ground power supply voltage (that is, a ground voltage).

The monitoring resistor part 11 and the terminating resistor part 15 have the same structure, and include a plurality of resistors R1 or R2 (that is, n resistors, where n is an integer greater than one) that are connected in parallel depending on ON/OFF states of corresponding switches SW. In each of the resistor parts 11 and 15, the number of resistors R1 or R2 that are connected in parallel, that is, the resistance of each of the resistor parts 11 and 15, is controlled by the control part 16 that controls the ON/OFF states of the switches SW. When inconsistencies introduced during the production process are taken into consideration, it is preferable that the resistances of each of the resistors R1 and R2 are the same. However, if the resistances of the corresponding resistors R1 and R2 between the resistor parts 11 and 15 fall within a predetermined integer ratio, it is possible to provide resistors R1 and R2 having different resistances within the resistor parts 11 and 15. For example, the resistance of the resistor R1 within the resistor part 11 may be N times the resistance of the resistor R2 within the resistor part 15, where N is an integer.

When making a calibration to set the resistance of the terminating resistor part 15 to a desired value (or an optimum value), a reference voltage Vref and a voltage V1 at a node that connects the current supply circuit 12 and the resistors R1 of the monitoring resistor part 11 are input to the comparator circuit 14. A comparison result that is output from the comparator circuit 14 is supplied to the control part 16. The control part 16 controls the number of switches SW that is turned ON or OFF until the comparison result output from the comparator circuit 14 indicates that the voltage V1 is equal to the reference voltage Vref. Since the reference voltage Vref is set so that the resistance of the monitoring resistor part 11 becomes a desired value, the resistance of the monitoring resistor part 11 is controlled to the desired value in the state where the voltage V1 is equal to the reference voltage Vref. For this reason, in this state, the resistance of the terminating resistor part 15 is also controlled to this desired value, that is, the optimum value.

Therefore, when the calibration is made, the actual resistance of the monitoring resistor part 11 is controlled to the desired value. Hence, the actual resistance of the terminating resistor part 15 having the same structure as the monitoring resistor part 11 is similarly controlled to the desired value, thereby making it possible to accurately control and set the actual resistance of the terminating resistor part 15. In addition, when making the calibration, it is unnecessary to supply a currently directly to a transmission line that is connected to the external terminal 19, and as a result, it is possible to make an accurate calibration that is closed within the transmitting and receiving system 10 with respect to the terminating resistor part 15 that is provided within the transmitting and receiving system 10. Furthermore, as in the case of some of the embodiments described hereinafter, it is also possible to design the transmitting and receiving system 10 so that the calibration can be made even in a state where the transmitting and receiving system 10 is making a data transmission and/or a data reception.

Next, a description will be given of embodiments of a terminating resistance adjusting method, a semiconductor integrated circuit and a semiconductor device according to the present invention, by referring to FIG. 3 and the subsequent drawings.

First Embodiment

Figure 3:
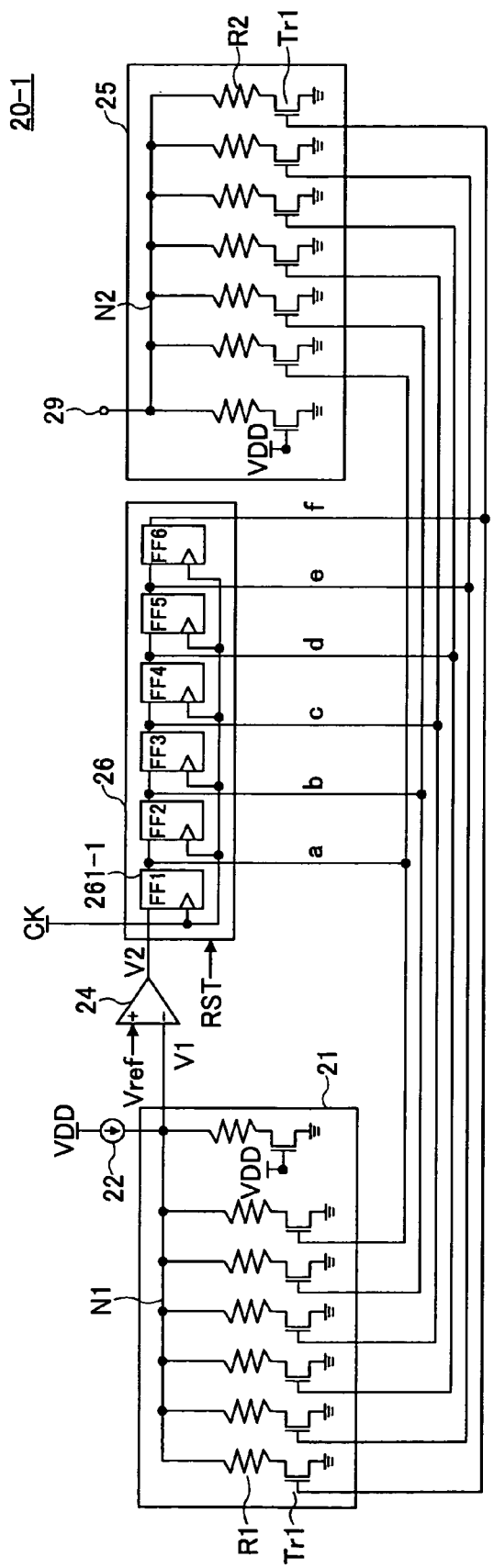
FIG. 3 is a diagram showing a first embodiment of a semiconductor device according to the present invention.

FIG. 3 is a diagram showing an important part of a first embodiment of the semiconductor device according to the present invention. This embodiment of the semiconductor device forms a transmitting and receiving system, and employs a first embodiment of the terminating resistance adjusting method and the semiconductor integrated circuit according to the present invention. In FIG. 3 and the subsequent drawings showing the various embodiments, the illustration of a transmitting and receiving part of the semiconductor device, such as a driver and a receiver, will be omitted for the sake of convenience.

A semiconductor device (or semiconductor chip) 20-1 shown in FIG. 3 includes a monitoring resistor part 21, a current source circuit 22, a comparator circuit 24, a terminating resistor part 25, a shift register part 26, and an external terminal 29. The external terminal 29 connects to another transmitting and receiving system, that is, another semiconductor device, via a transmission line or a transmission path (not shown). In FIG. 3, VDD denotes a power supply voltage.

The monitoring resistor part 21 and the terminating resistor part 25 have the same structure, and include a plurality of resistors R1 or R2 that are connected in parallel depending on ON/OFF states of corresponding nMOS transistors Tr1. In each of the resistor parts 21 and 25, the number of resistors R1 or R2 that are connected in parallel, that is, the resistance of each of the resistor parts 21 and 25, is controlled by the shift register part 26 that controls the ON/OFF states of the nMOS transistors Tr1. In this embodiment and the embodiments described later, it is assumed for the sake of convenience that the monitoring resistor part 21 has seven resistors R1, and that one of the seven resistors R1 is fixedly connected between a node N1 and a ground power supply voltage while the remaining six resistors R1 are selectively connected between the node N1 and the ground power supply voltage. However, the number of resistors R1 is of course not limited to seven. Similarly, it is assumed for the sake of convenience that the terminating resistor part 25 has seven resistors R2, and that one of the seven resistors R2 is fixedly connected between a node N2, which connects to the external terminal 29, and the ground power supply voltage while the remaining six resistors R2 are selectively connected between the node N2 and the ground power supply voltage. When inconsistencies introduced during the production process are taken into consideration, it is preferable that the resistances of each of the resistors R1 and R2 are the same. However, if the resistances of the corresponding resistors R1 and R2 between the resistor parts 21 and 25 fall within a predetermined integer ratio, it is possible to provide resistors R1 and R2 having different resistances within the resistor parts 21 and 25.

Figure 4A:
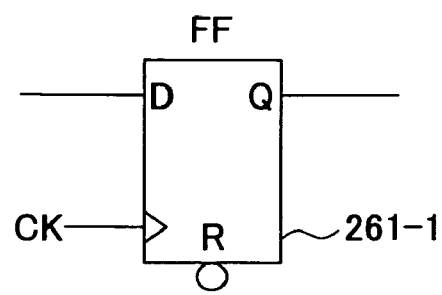
FIGS. 4A and 4B are diagrams for explaining a flip-flop forming a shift register part.
Figure 4B:
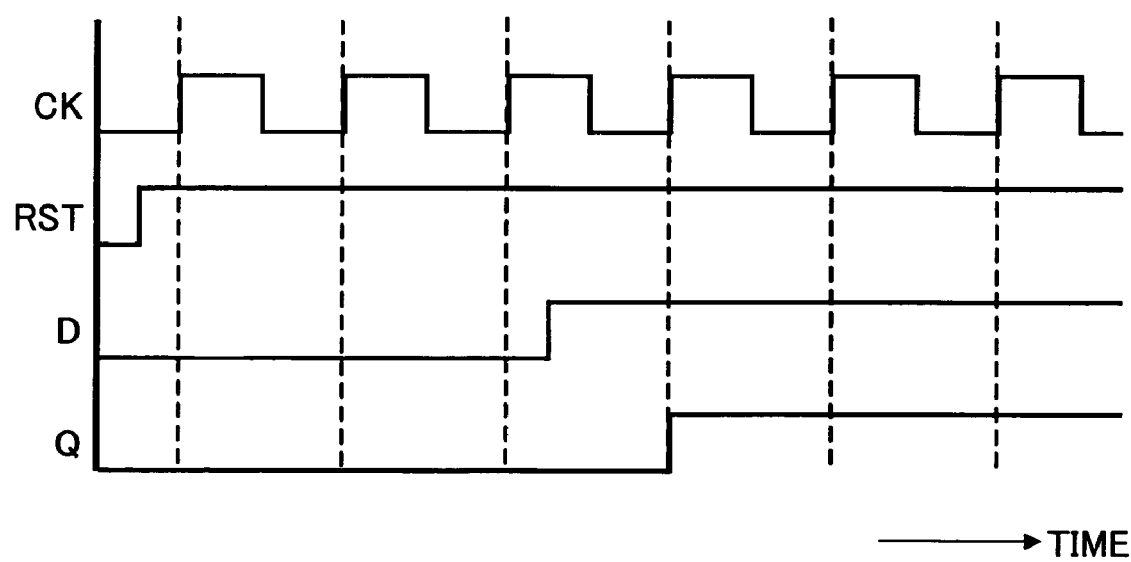

In this embodiment, the shift register part 26 has six flip-flops 261-1 that are connected in series to match the number of resistors R1 and R2 selectively connectable in each of the resistor parts 21 and 25. FIGS. 4A and 4B are diagrams for explaining the flip-flop (FF) 261-1 forming the shift register part 26. FIG. 4A shows the flip-flop 261-1, and FIG. 4B shows waveforms of a clock signal CK input to a clock terminal, a reset signal RST input to a reset terminal R, a signal D input to an input terminal D, and a signal Q output from an output terminal Q of the flip-flop 261-1. The shift register part 26 of this embodiment corresponds to the control part 16 shown in FIG. 2.

The calibration refers to an operation of setting the resistance of the monitoring resistor part 21, which has the same structure as the terminating resistor part 25, to a desired value, so as to set the resistance of the terminating resistor part 25 to this desired value. In this embodiment, this calibration is carried out in a system initializing state or an idle state of the semiconductor device 20-1. The system initializing state refers to a state where the power is input to the semiconductor device 20-1 or, a state that is restored from a power down (or suspend) state. In addition, the idle state refers to a state where the semiconductor device 20-1 is not making a data transmission and/or a data reception, that is, not making communicating operation.

When making the calibration in the system initializing state or the idle state, the reference voltage Vref and the voltage V1 at the node N1 that connects the current supply circuit 22 and the resistors R1 of the monitoring resistor part 21 are input to the comparator circuit 24. A signal V2 indicating a comparison result is output from the comparator circuit 24 and is supplied to the shift register part 26. The shift register part 26 controls the number of nMOS transistors Tr1 that is turned ON or OFF until the signal V2 output from the comparator circuit 24 indicates that the voltage V1 is equal to the reference voltage Vref. Since the reference voltage Vref is set so that the resistance of the monitoring resistor part 21 becomes the desired value, the resistance of the monitoring resistor part 21 is controlled to the desired value in the state where the voltage V1 is equal to the reference voltage Vref. The clock signal CK is input to the shift register part 26 until the voltage V1 becomes equal to the reference voltage Vref, and the pulse of the clock signal CK is fixed to a low level (logical value "0"), for example, when the resistance of the monitoring resistor part 21 becomes the desired value. For this reason, in this state, the resistance of the terminating resistor part 25 is also controlled to the desired value, that is, to the optimum value.

Figure 5:
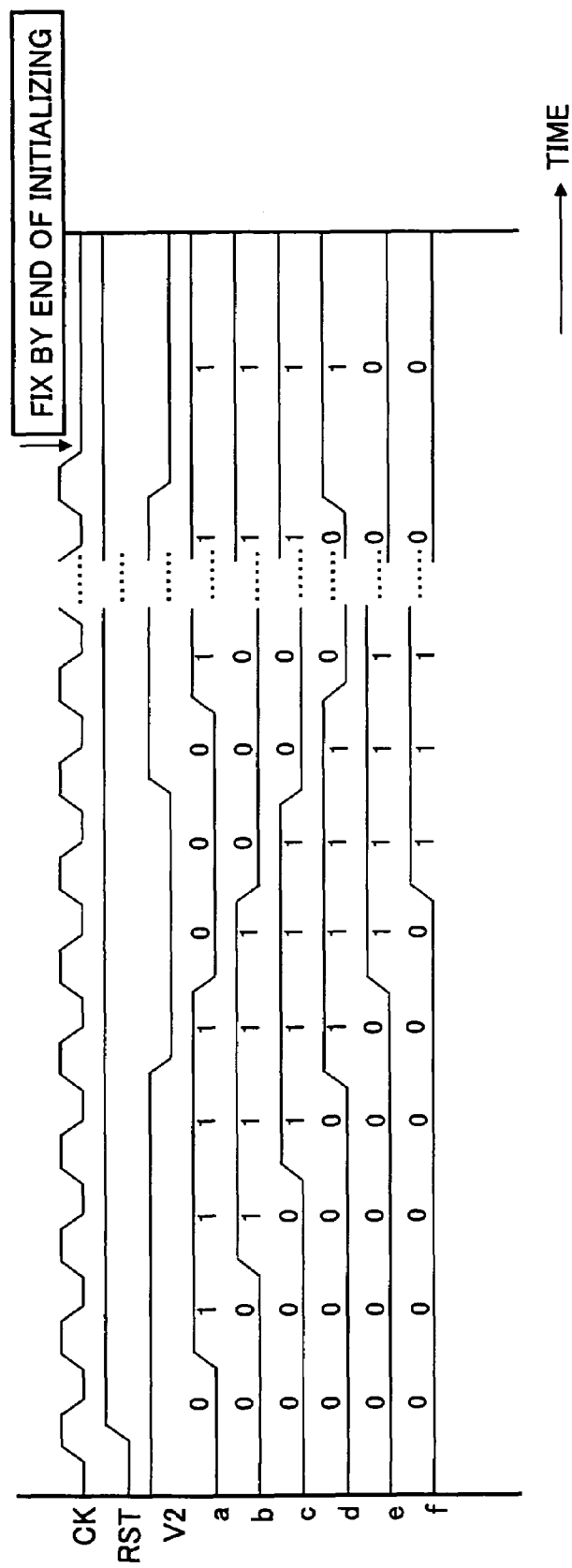
FIG. 5 is a timing chart for explaining an operation of the first embodiment in an initializing state.
Figure 6:
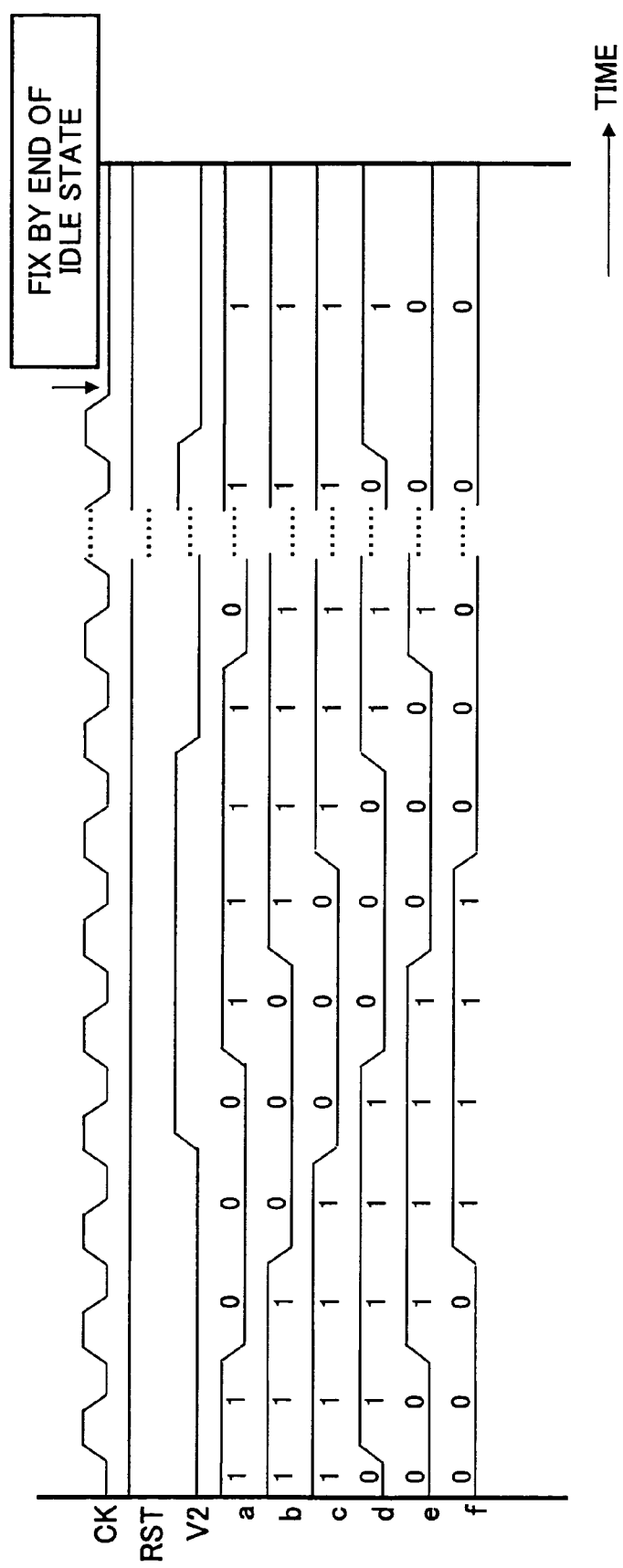
FIG. 6 is a timing chart for explaining the operation of the first embodiment in an idle state.

FIG. 5 is a timing chart for explaining the operation of the first embodiment in the initializing state, and FIG. 6 is a timing chart for explaining the operation of the first embodiment in the idle state. In FIGS. 5 and 6 and the timing charts which will be described later, the output signals Q of the flip-flop 261-1 provided at the first stage through the flip-flop 261-1 provided at the sixth stage of the shift register part 26 are respectively indicated by "a" through "f". In addition, numerals "0" and "1" indicated above and below the waveform indicate the logical values.

Therefore, by controlling the actual resistance of the monitoring resistor part 21 to become the desired value when making the calibration, the actual resistance of the terminating resistor part 25 which has the same structure as the monitoring resistor part 21 is also similarly controlled to the desired value, to thereby accurately control and set the actual resistance of the terminating resistor part 25. Moreover, since it is unnecessary to supply a current directly to the transmission line that is connected to the external terminal 29 when making the calibration, it is possible to make an accurate calibration that is closed within the semiconductor device 20-1, with respect to the terminating resistor part 25 that is provided within the semiconductor device 20-1.

In this embodiment, the calibration cannot be made in a state where the semiconductor device 20-1 is making a data transmission and/or a data reception, that is, in a state where the semiconductor device 20-1 is making a communicating operation.

Second Embodiment

Figure 7:
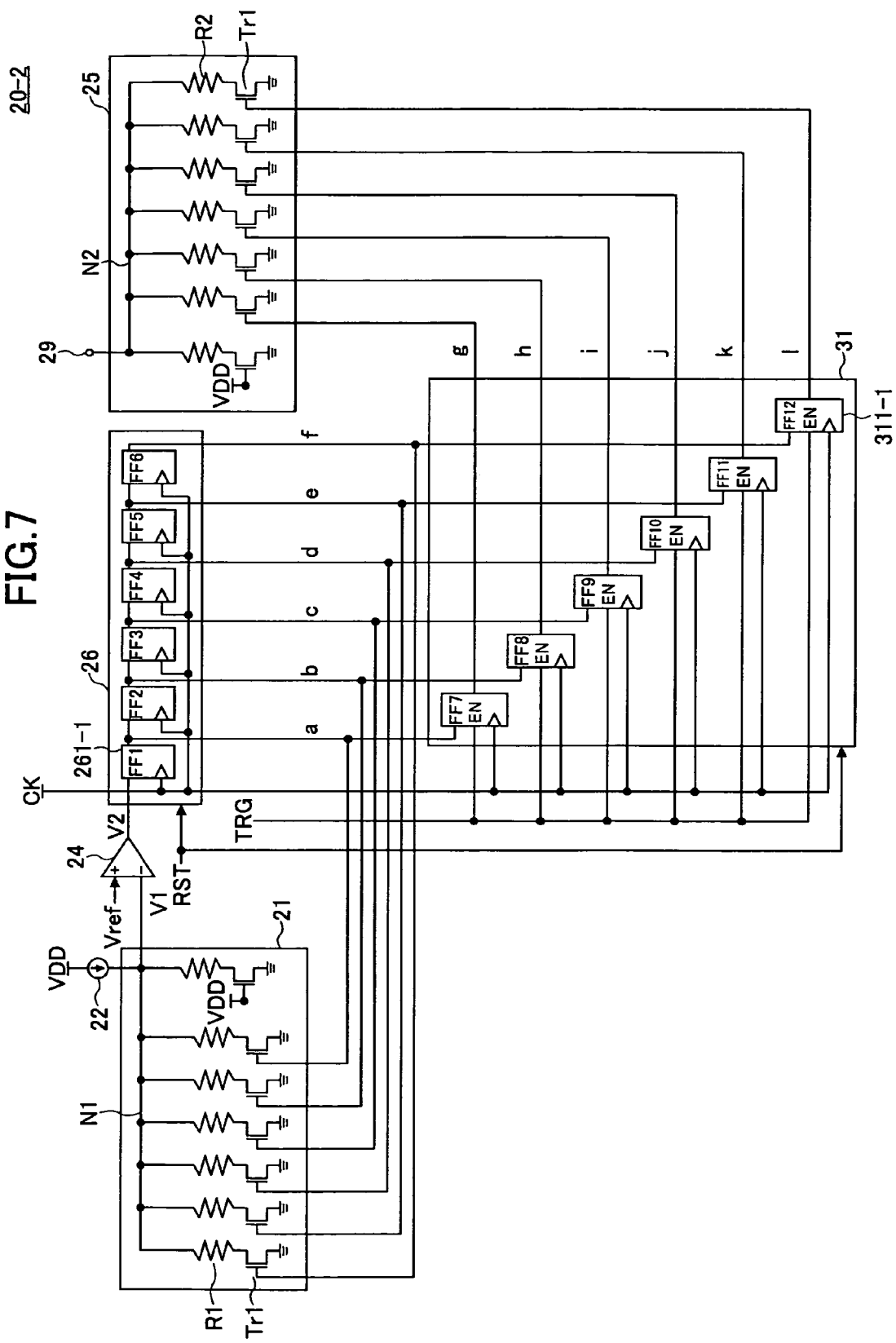
FIG. 7 is a diagram showing a second embodiment of the semiconductor device according to the present invention.

FIG. 7 is a diagram showing an important part of a second embodiment of the semiconductor device according to the present invention. This embodiment of the semiconductor device forms a transmitting and receiving system, and employs a second embodiment of the terminating resistance adjusting method and the semiconductor integrated circuit according to the present invention. In FIG. 7, those parts that are the same as those corresponding parts in FIG. 3 are designated by the same reference numerals, and a description thereof will be omitted.

Figure 8A:
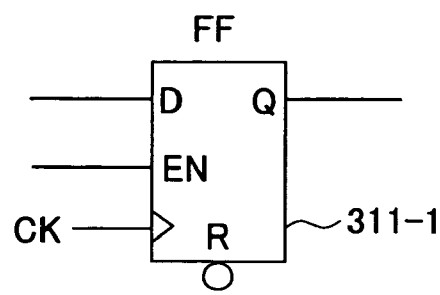
FIGS. 8A and 8B are diagrams for explaining a flip-flop forming a timing control part.
Figure 8B:
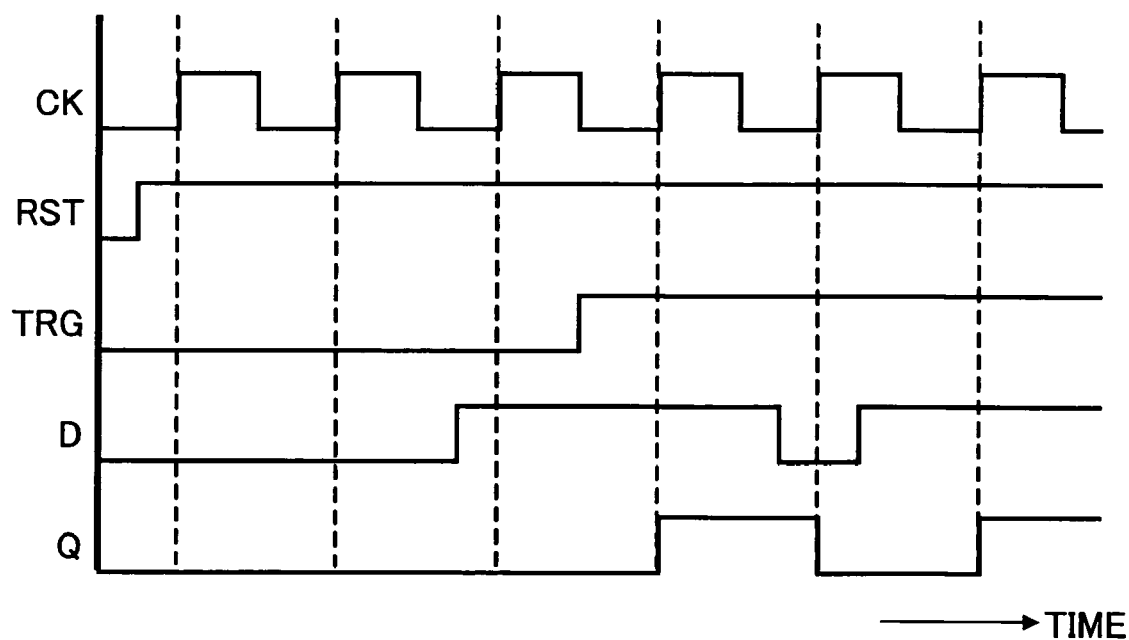

In this embodiment, a semiconductor device 20-2 includes a timing control part 31 for controlling a resistance control timing of the terminating resistor part 25 based on a trigger signal TRG. The timing control part 31 has six flip-flops 311-1 that are connected as shown in FIG. 7 to match the number of resistors R2 selectively connectable in the terminating resistor part 25. FIGS. 8A and 8B are diagrams for explaining the flip-flop (FF) 311-1 forming the timing control part 31. FIG. 8A shows the flip-flop 311-1, and FIG. 8B shows waveforms of a clock signal CK input to a clock terminal, a reset signal RST input to a reset terminal R, the trigger signal TRG input to an enable terminal EN, a signal D input to an input terminal D, and a signal Q output from an output terminal Q of the flip-flop 311-1. The shift register part 26 and the timing control part 31 of this embodiment corresponds to the control part 16 shown in FIG. 2.

FIG. 9 is a timing chart for explaining the operation of the second embodiment in the initializing state, and FIG. 10 is a timing chart for explaining the operation of the second embodiment in the idle state or the communicating state.

The output signal of the shift register part 26 is supplied to the terminating resistor part 25 after being input to the timing control part 31 in response to the trigger signal TRG which is high-active. Since the control and setting of the resistance of the terminating resistor part 25 are made in the idle state in response to the trigger signal TRG, it becomes possible to constantly input the clock signal CK to the shift register part 26, and the resistance of the monitoring resistor part 21 can be constantly controlled and set to the desired value. In other words, this embodiment can make the calibration even in the state where the semiconductor device 20-2 is making the data transmission and/or the data reception, that is, even in the state where the semiconductor device 20-2 is making the communicating operation.

Third Embodiment

Figure 11:
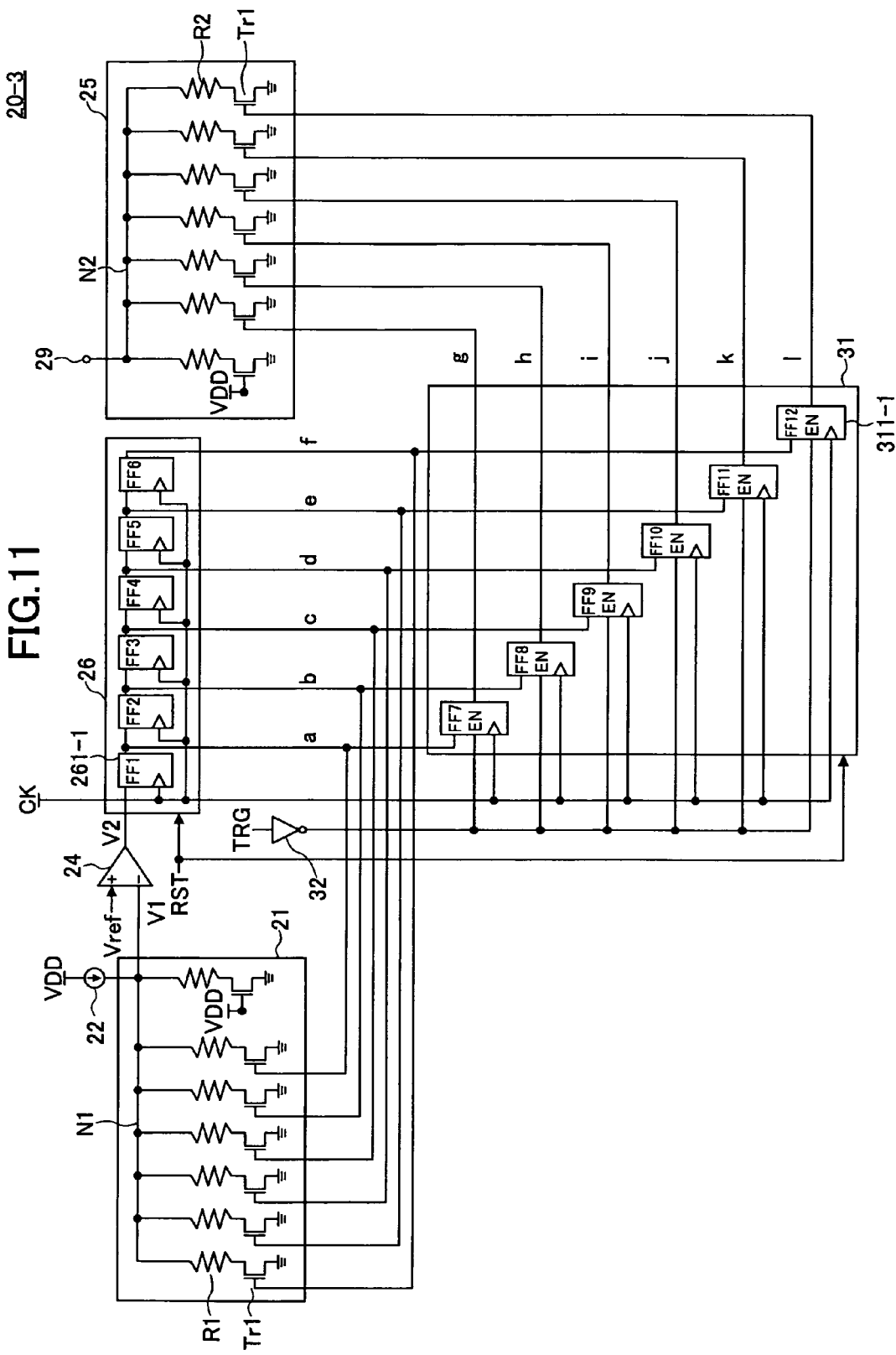
FIG. 11 is a diagram showing a third embodiment of the semiconductor device according to the present invention.

FIG. 11 is a diagram showing an important part of a third embodiment of the semiconductor device according to the present invention. This embodiment of the semiconductor device forms a transmitting and receiving system, and employs a third embodiment of the terminating resistance adjusting method and the semiconductor integrated circuit according to the present invention. In FIG. 11, those parts that are the same as those corresponding parts in FIG. 7 are designated by the same reference numerals, and a description thereof will be omitted.

In this embodiment, a semiconductor device 20-3 includes an inverter 32, and a timing control part 31 for controlling a resistance control timing of the terminating resistor part 25 based on a trigger signal TRG. The timing control part 31 has six flip-flops 311-1 that are connected as shown in FIG. 11 to match the number of resistors R2 selectively connectable in the terminating resistor part 25. The shift register part 26 and the timing control part 31 of this embodiment corresponds to the control part 16 shown in FIG. 2.

Figure 12:
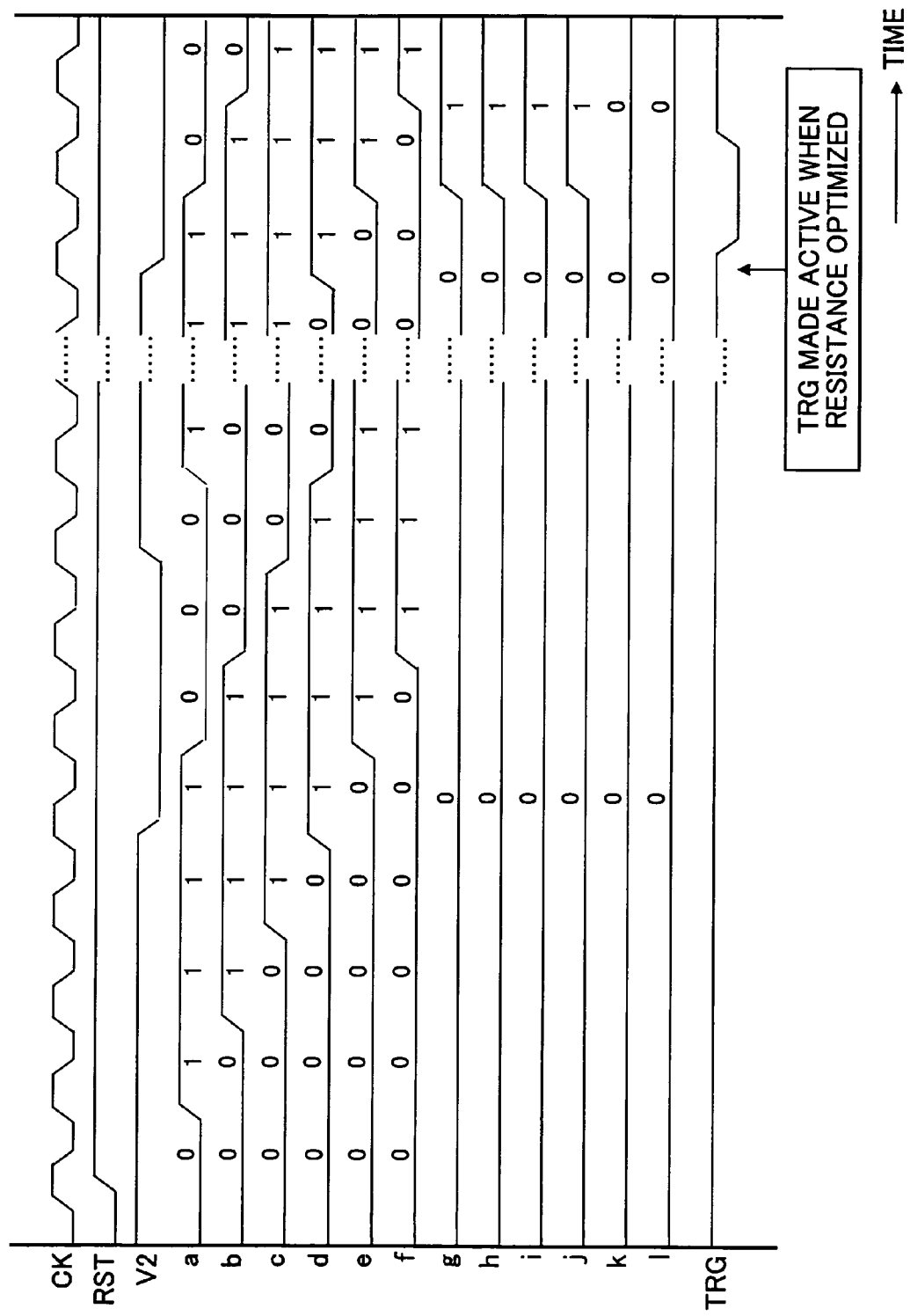
FIG. 12 is a timing chart for explaining the operation of the third embodiment in the initializing state.
Figure 13:
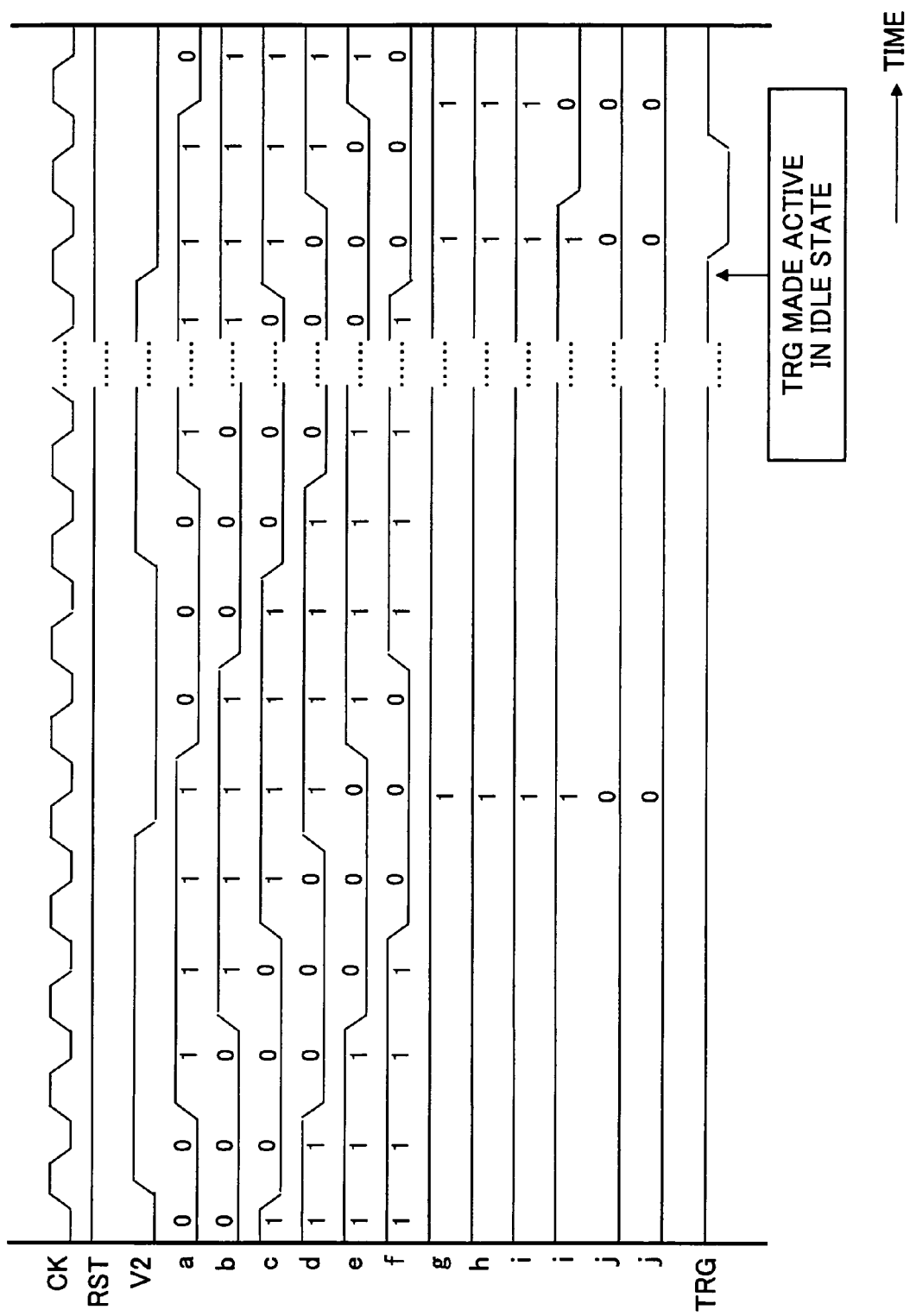
FIG. 13 is a timing chart for explaining the operation of the third embodiment in the idle state or the communicating state.

FIG. 12 is a timing chart for explaining the operation of the third embodiment in the initializing state, and FIG. 13 is a timing chart for explaining the operation of the third embodiment in the idle state or the communicating state.

The output signal of the shift register part 26 is supplied to the terminating resistor part 25 after being input to the timing control part 31 in response to the trigger signal TRG which is low-active and is obtained via the inverter 32. Since the control and setting of the resistance of the terminating resistor part 25 are made in the idle state in response to the trigger signal TRG, it becomes possible to constantly input the clock signal CK to the shift register part 26, and the resistance of the monitoring resistor part 21 can be constantly controlled and set to the desired value. In other words, this embodiment can make the calibration even in the state where the semiconductor device 20-3 is making the data transmission and/or the data reception, that is, even in the state where the semiconductor device 20-2 is making the communicating operation.

Fourth Embodiment

Figure 14:
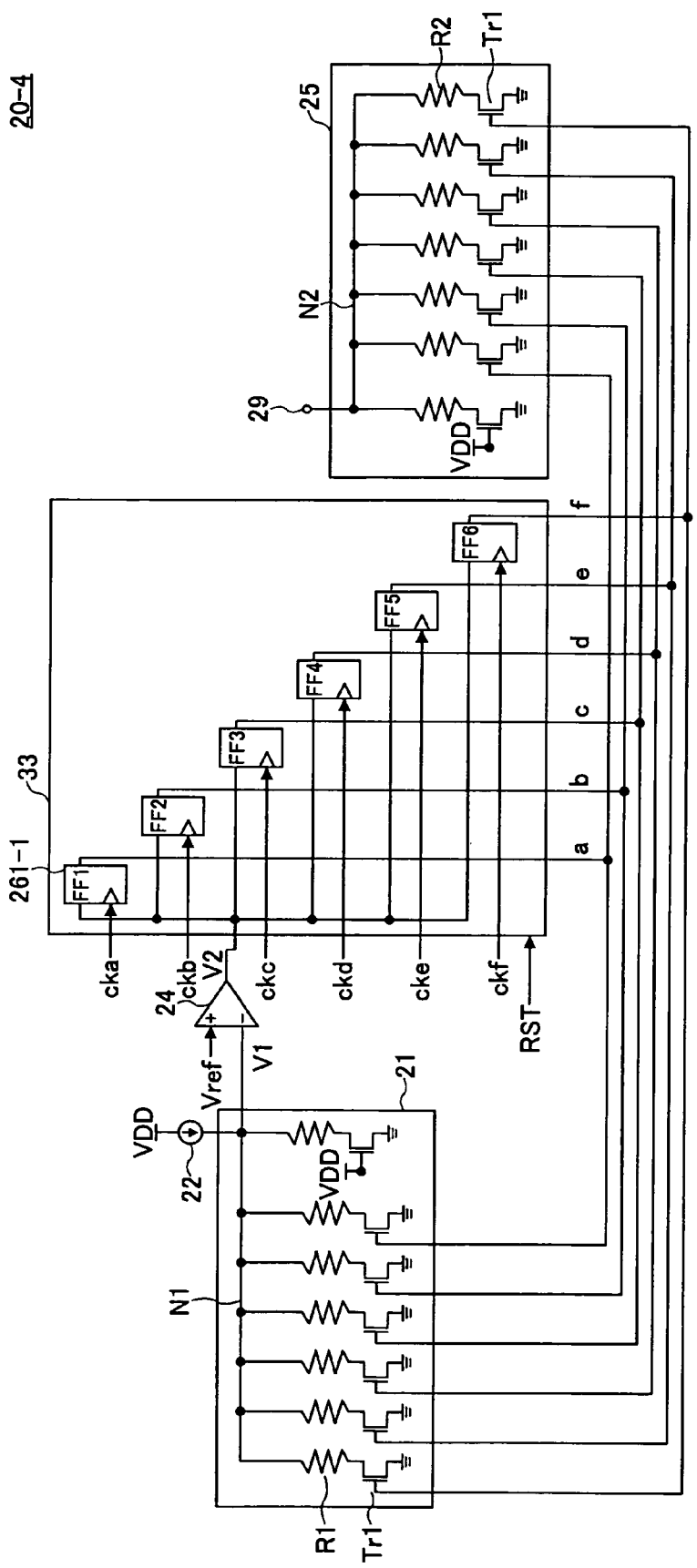
FIG. 14 is a diagram showing a fourth embodiment of the semiconductor device according to the present invention.

FIG. 14 is a diagram showing an important part of a fourth embodiment of the semiconductor device according to the present invention. This embodiment of the semiconductor device forms a transmitting and receiving system, and employs a fourth embodiment of the terminating resistance adjusting method and the semiconductor integrated circuit according to the present invention. In FIG. 14, those parts that are the same as those corresponding parts in FIG. 3 are designated by the same reference numerals, and a description thereof will be omitted.

In this embodiment, a semiconductor device 20-4 includes a shift register part 33 that is input with clock signals cka through ckf having six phases. The phases of the clock signals cka through ckf are mutually different. The shift register part 33 has six flip-flops 261-1 that are connected in parallel as shown in FIG. 14 to match the number of resistors R1 and R2 selectively connectable in each of the resistor parts 21 and 25. The shift register part 33 of this embodiment corresponds to the control part 16 shown in FIG. 2.

Figure 15:
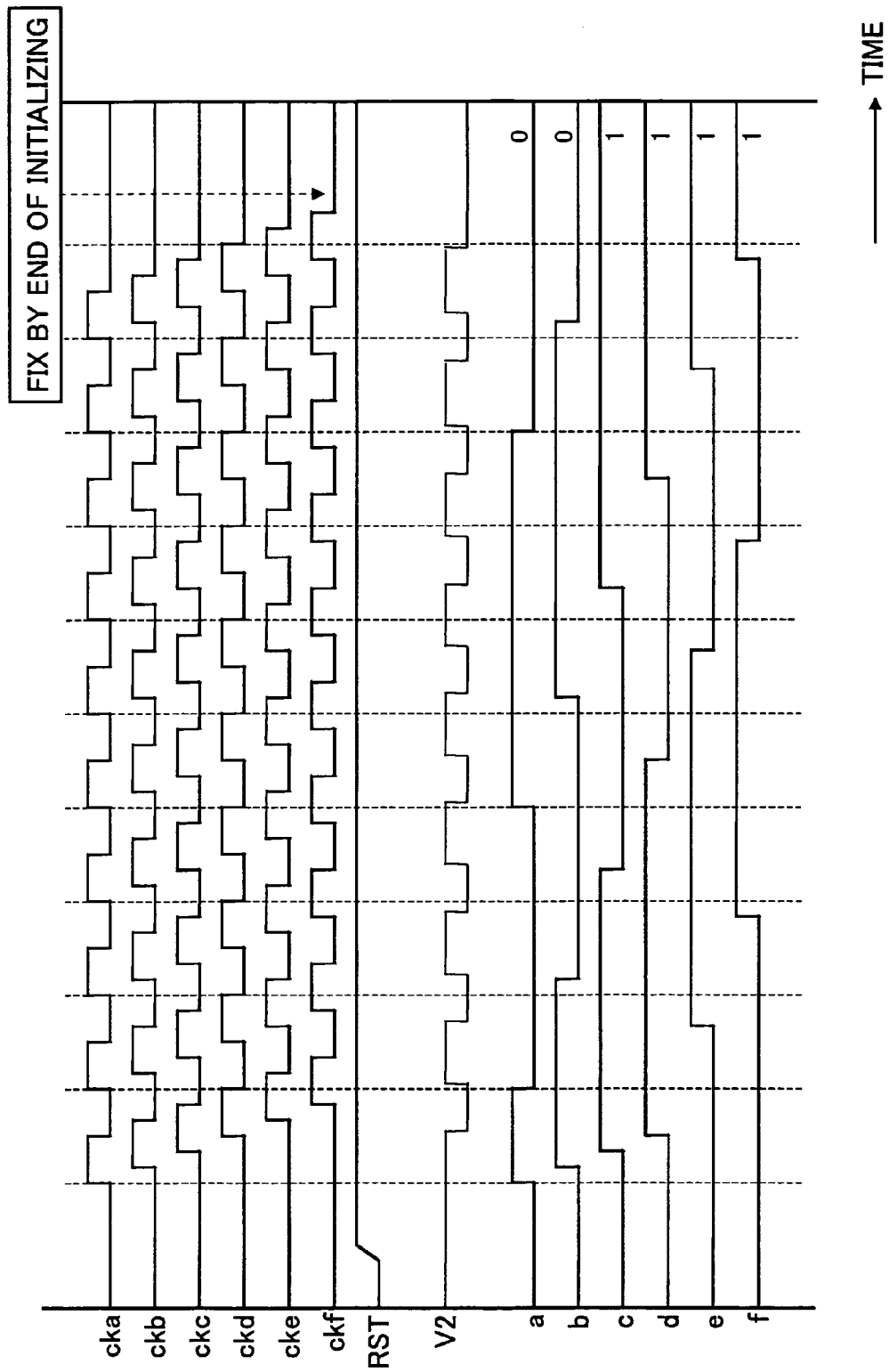
FIG. 15 is a timing chart for explaining the operation of the fourth embodiment in the initializing state.
Figure 16:
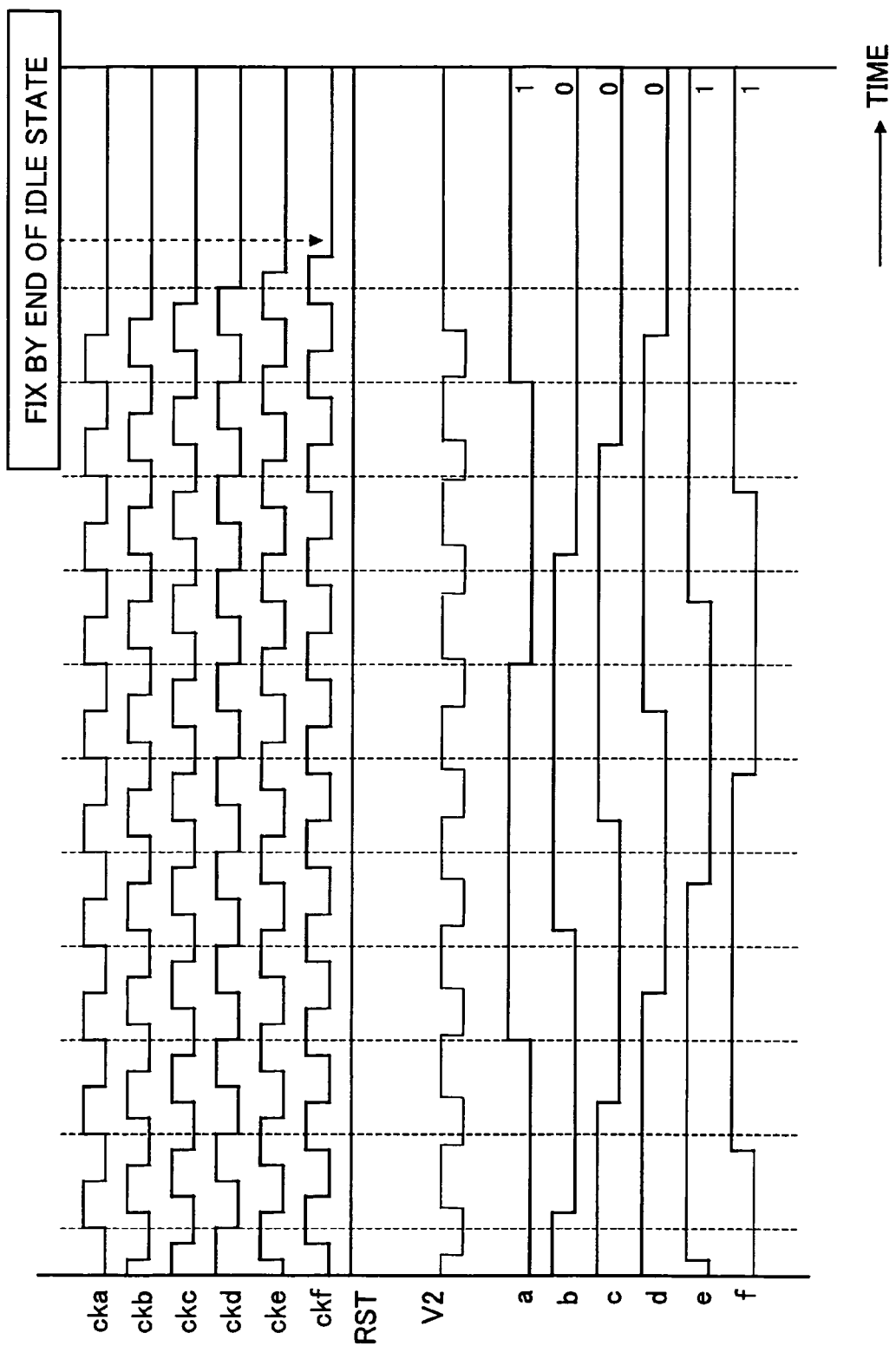
FIG. 16 is a timing chart for explaining the operation of the fourth embodiment in the idle state.

FIG. 15 is a timing chart for explaining the operation of the fourth embodiment in the initializing state, and FIG. 16 is a timing chart for explaining the operation of the fourth embodiment in the idle state.

Similarly as in the case of the first embodiment described above, the calibration can be made in the initializing state or the idle state of the semiconductor device 20-4, but the calibration cannot be made in a state where the semiconductor device 20-4 is making the data transmission and/or the data reception, that is, in a state where the semiconductor device 20-4 is making the communicating operation.

Fifth Embodiment

Figure 17:
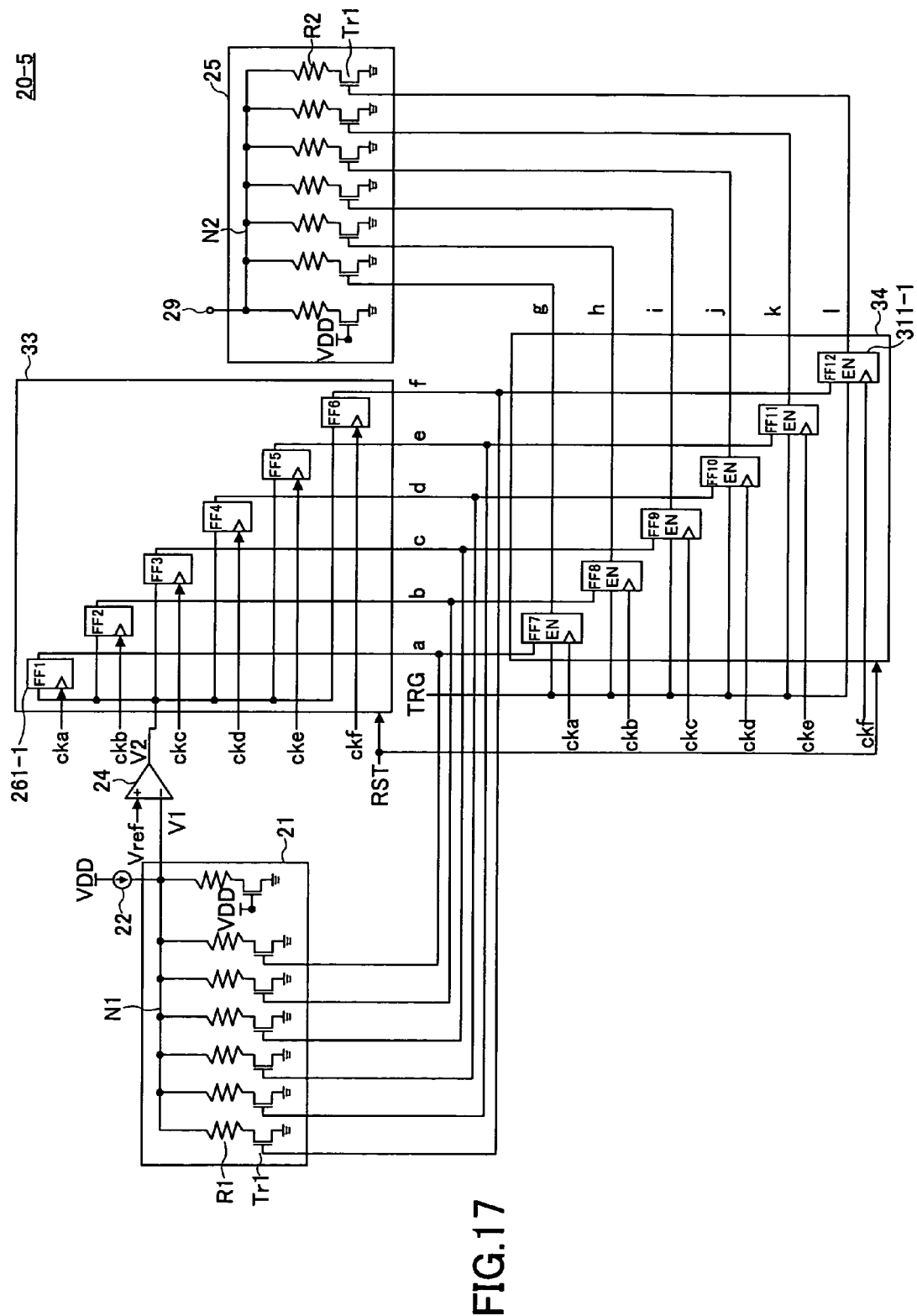
FIG. 17 is a diagram showing a fifth embodiment of the semiconductor device according to the present invention.

FIG. 17 is a diagram showing an important part of a fifth embodiment of the semiconductor device according to the present invention. This embodiment of the semiconductor device forms a transmitting and receiving system, and employs a fifth embodiment of the terminating resistance adjusting method and the semiconductor integrated circuit according to the present invention. In FIG. 17, those parts that are the same as those corresponding parts in FIG. 14 are designated by the same reference numerals, and a description thereof will be omitted.

In this embodiment, a semiconductor device 20-5 includes a timing control part 34 for controlling a resistance control timing of the terminating resistor part 25 based on a trigger signal TRG. The timing control part 34 has six flip-flops 311-1 that are connected as shown in FIG. 17 to match the number of resistors R2 selectively connectable in the terminating resistor part 25. The shift register part 33 and the timing control part 34 of this embodiment corresponds to the control part 16 shown in FIG. 2.

Figure 18:
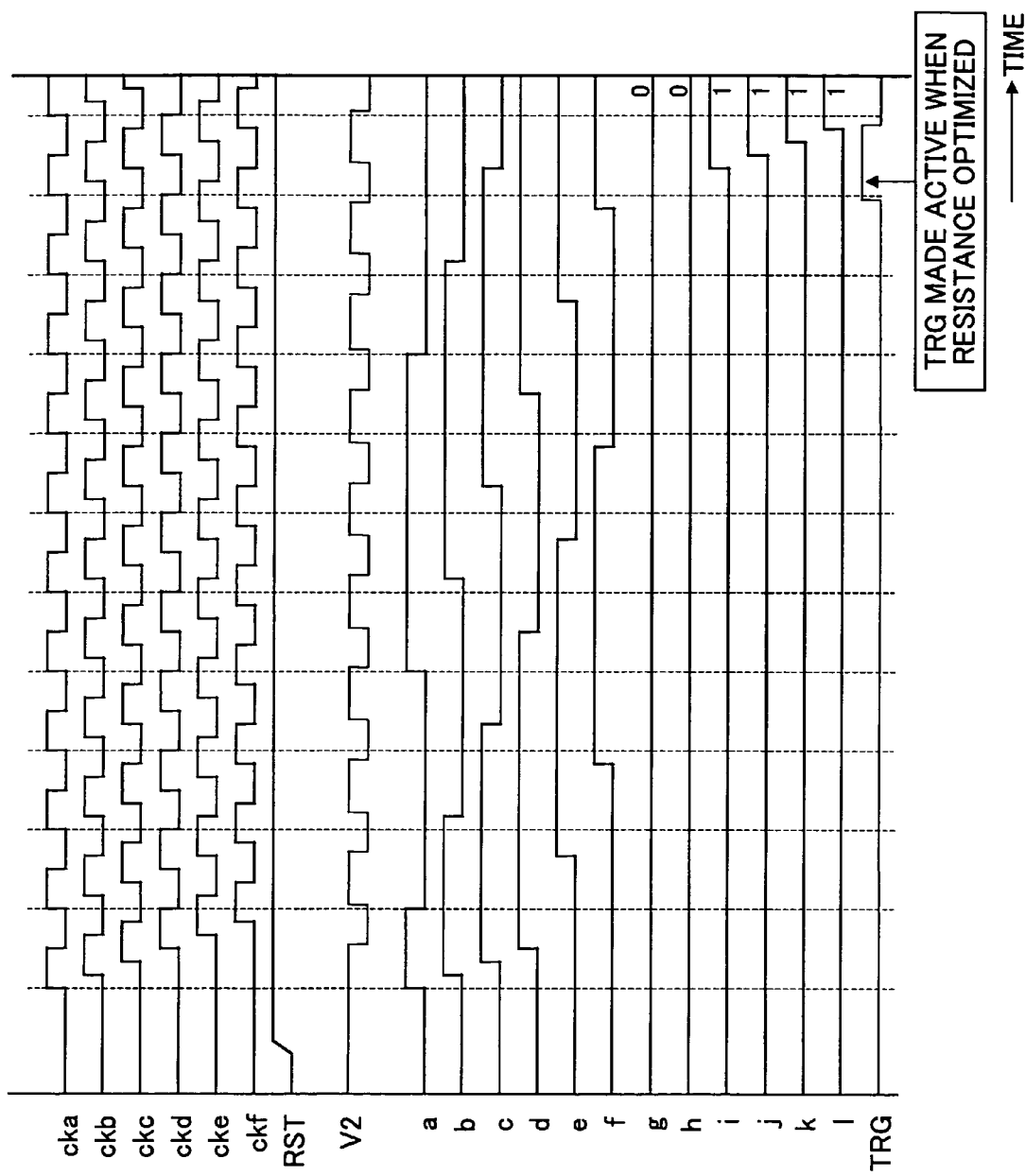
FIG. 18 is a timing chart for explaining the operation of the fifth embodiment in the initializing state.
Figure 19:
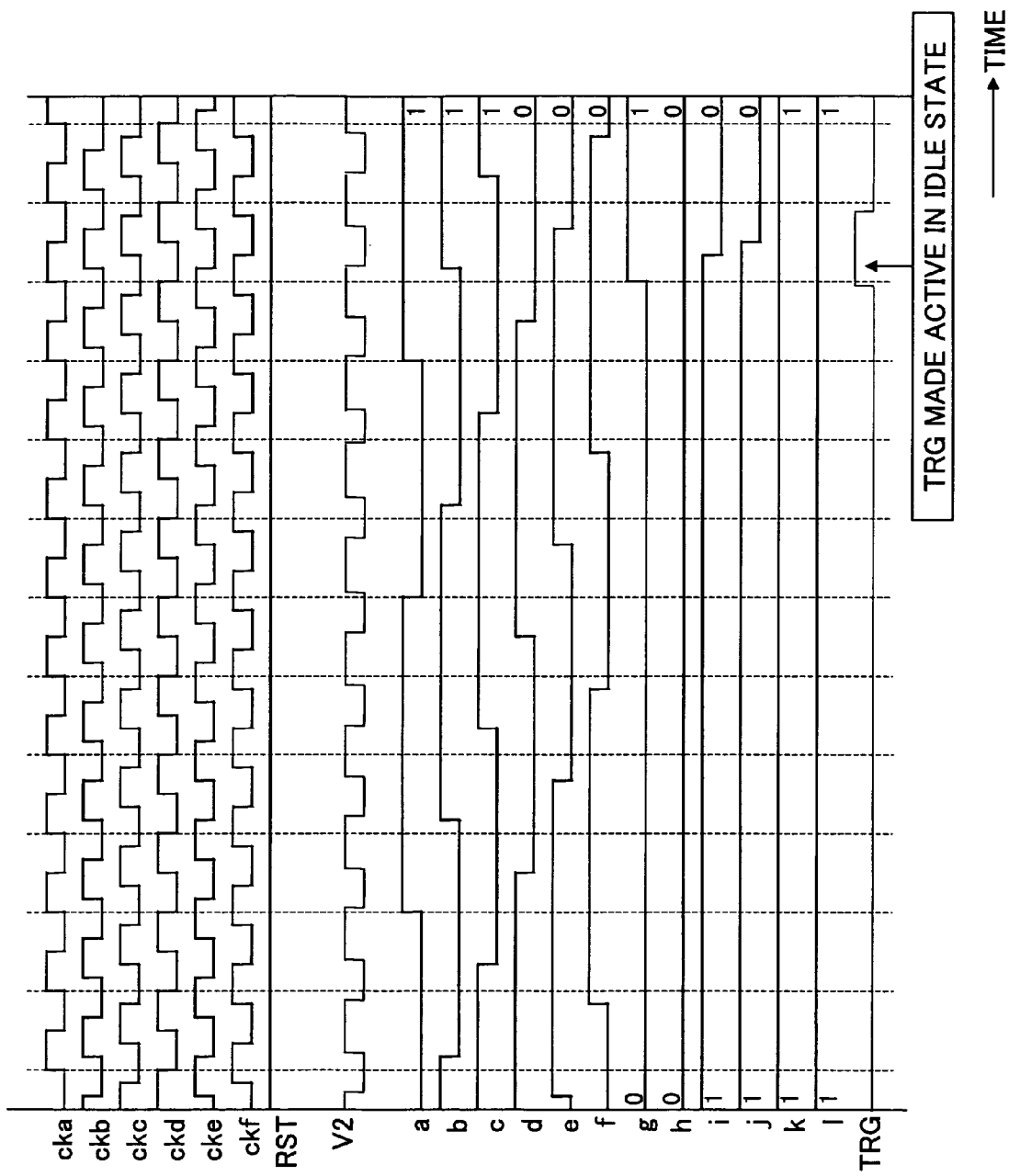
FIG. 19 is a timing chart for explaining the operation of the fifth embodiment in the idle state or the communicating state.

FIG. 18 is a timing chart for explaining the operation of the fifth embodiment in the initializing state, and FIG. 19 is a timing chart for explaining the operation of the fifth embodiment in the idle state or the communicating state.

The output signal of the shift register part 33 is supplied to the terminating resistor part 25 after being input to the timing control part 34 in response to the trigger signal TRG which is high-active. Since the control and setting of the resistance of the terminating resistor part 25 are made in the idle state in response to the trigger signal TRG, it becomes possible to constantly input the clock signal CK to the shift register part 33, and the resistance of the monitoring resistor part 21 can be constantly controlled and set to the desired value. In other words, this embodiment can make the calibration even in the state where the semiconductor device 20-5 is making the data transmission and/or the data reception, that is, even in the state where the semiconductor device 20-5 is making the communicating operation.

Sixth Embodiment

Figure 20:
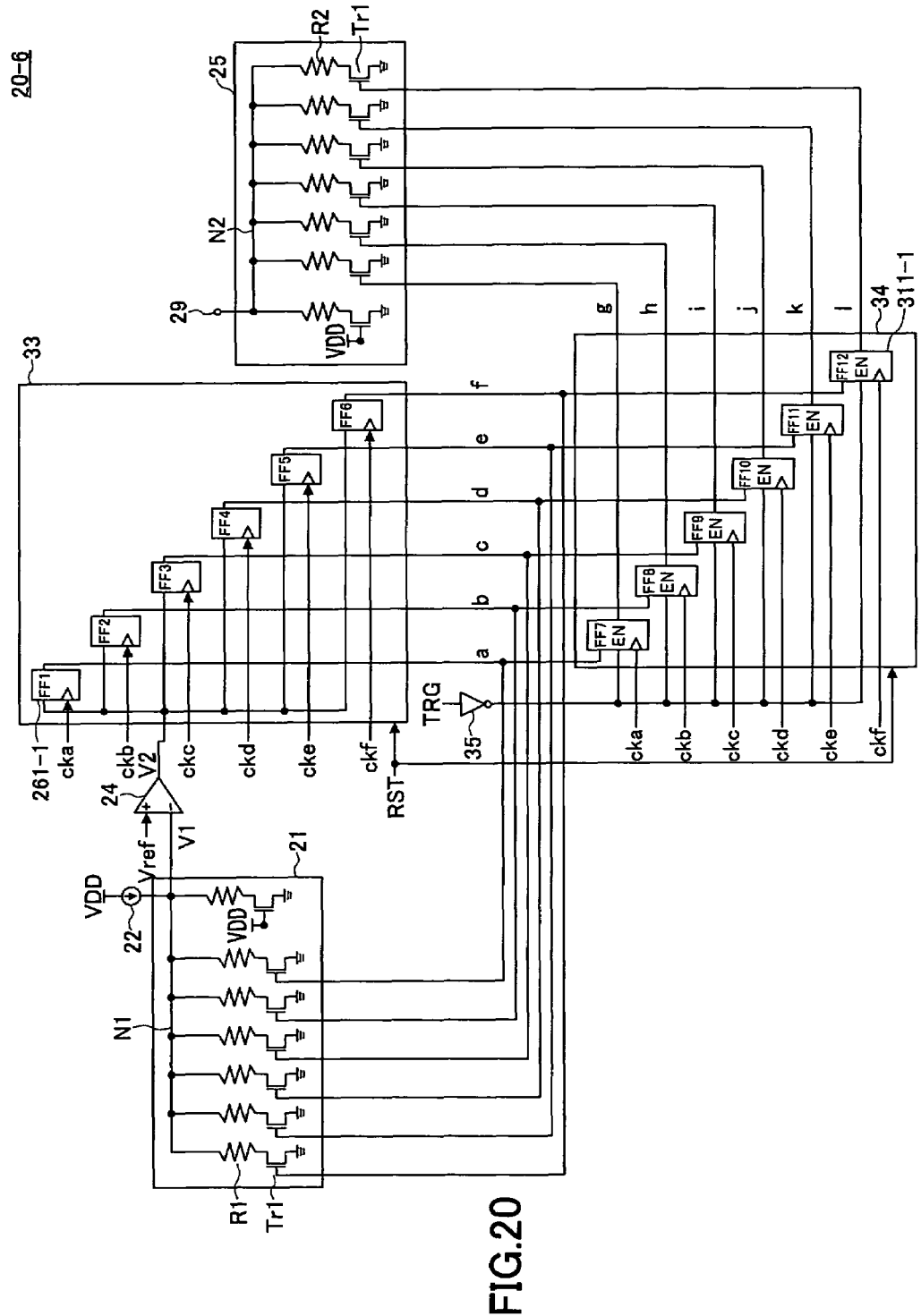
FIG. 20 is a diagram showing a sixth embodiment of the semiconductor device according to the present invention.

FIG. 20 is a diagram showing an important part of a sixth embodiment of the semiconductor device according to the present invention. This embodiment of the semiconductor device forms a transmitting and receiving system, and employs a sixth embodiment of the terminating resistance adjusting method and the semiconductor integrated circuit according to the present invention. In FIG. 20, those parts that are the same as those corresponding parts in FIG. 17 are designated by the same reference numerals, and a description thereof will be omitted.

In this embodiment, a semiconductor device 20-6 includes an inverter 35, and a timing control part 34 for controlling a resistance control timing of the terminating resistor part 25 based on a trigger signal TRG. The timing control part 34 has six flip-flops 311-1 that are connected as shown in FIG. 20 to match the number of resistors R2 selectively connectable in the terminating resistor part 25. The shift register part 33 and the timing control part 34 of this embodiment corresponds to the control part 16 shown in FIG. 2.

Figure 21:
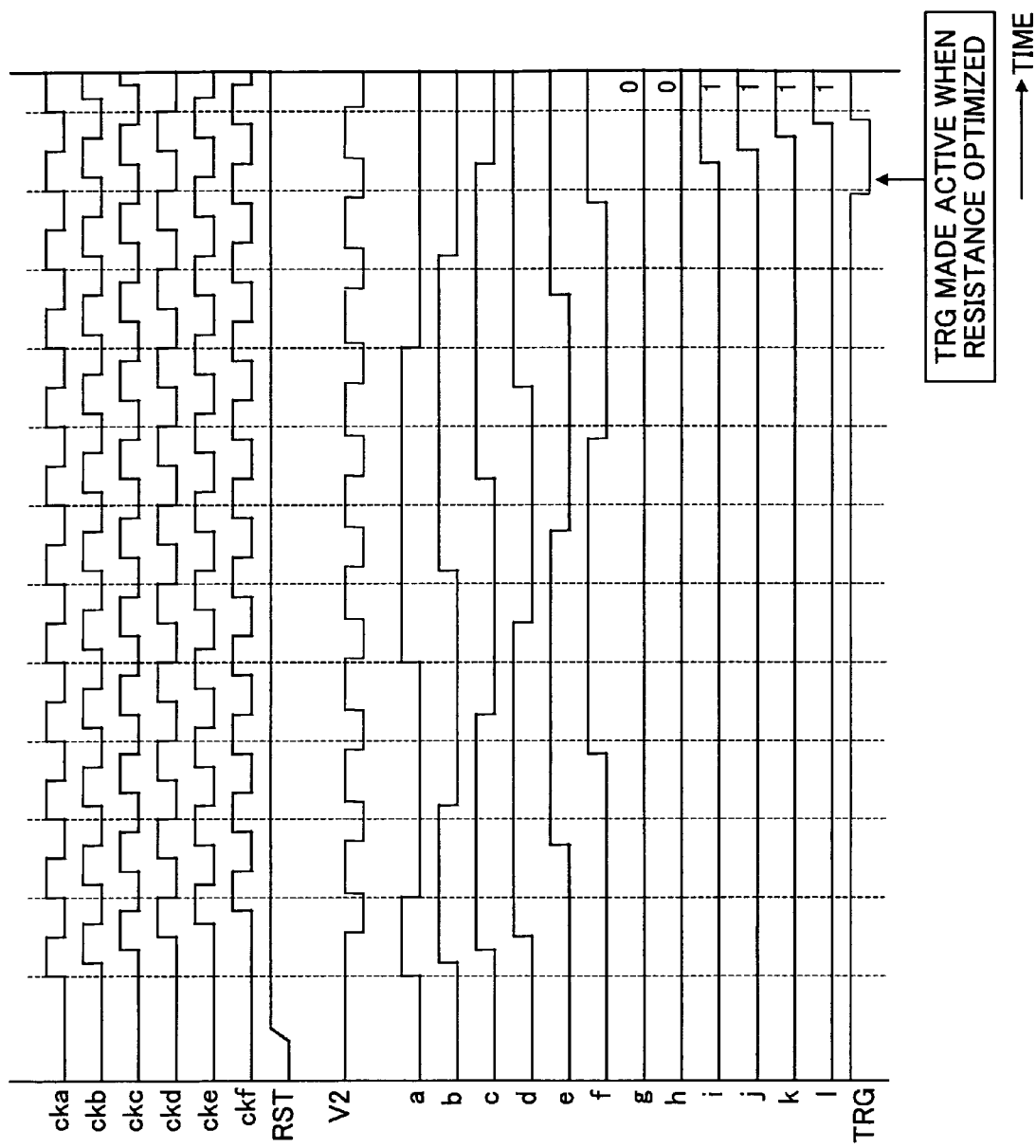
FIG. 21 is a timing chart for explaining the operation of the sixth embodiment in the initializing state.
Figure 22:
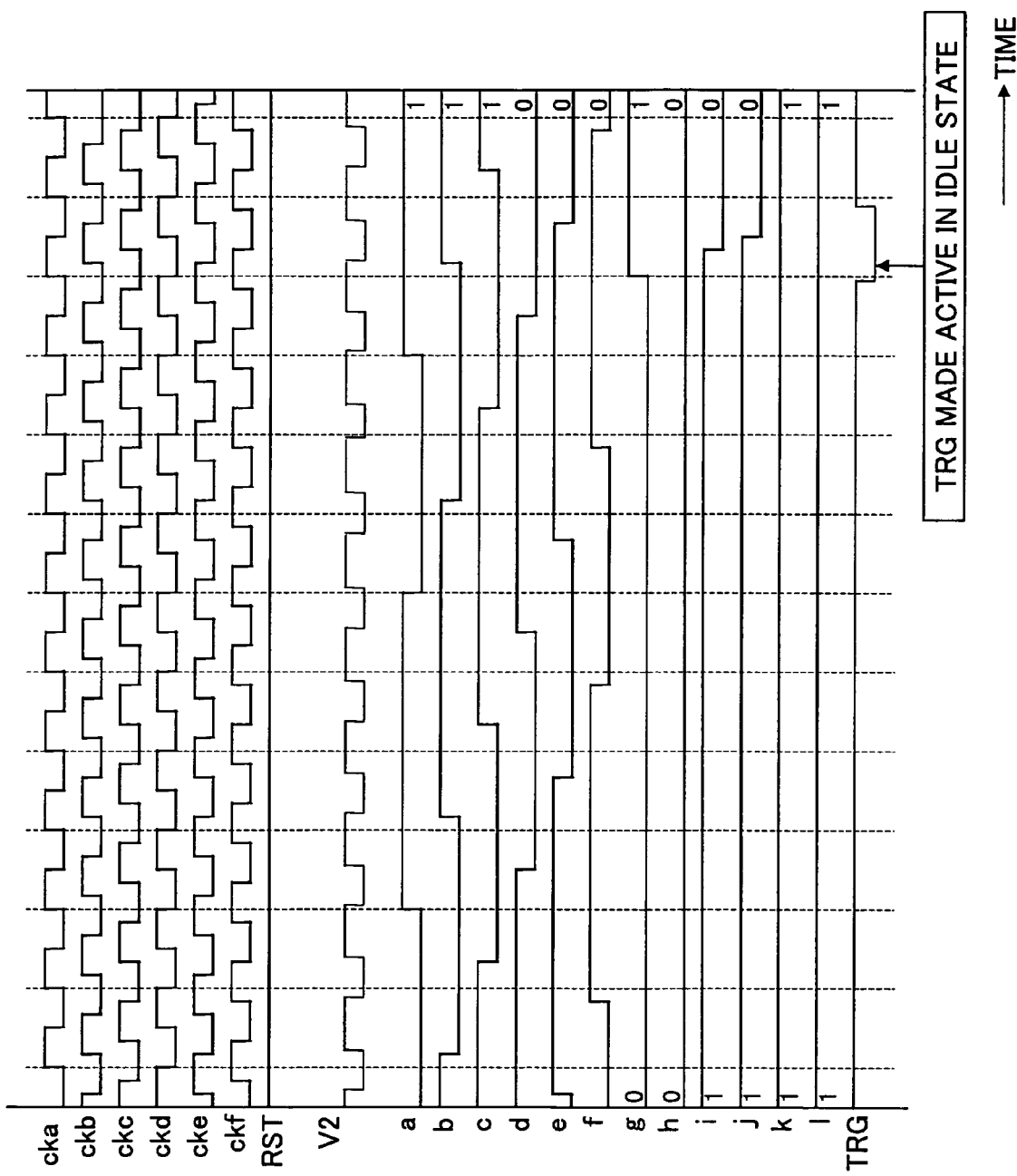
FIG. 22 is a timing chart for explaining the operation of the sixth embodiment in the idle state or the communicating state.

FIG. 21 is a timing chart for explaining the operation of the sixth embodiment in the initializing state, and FIG. 22 is a timing chart for explaining the operation of the sixth embodiment in the idle state or the communicating state.

The output signal of the shift register part 33 is supplied to the terminating resistor part 25 after being input to the timing control part 34 in response to the trigger signal TRG which is low-active and is obtained via the inverter 35. Since the control and setting of the resistance of the terminating resistor part 25 are made in the idle state in response to the trigger signal TRG, it becomes possible to constantly input the clock signal CK to the shift register part 33, and the resistance of the monitoring resistor part 21 can be constantly controlled and set to the desired value. In other words, this embodiment can make the calibration even in the state where the semiconductor device 20-6 is making the data transmission and/or the data reception, that is, even in the state where the semiconductor device 20-6 is making the communicating operation.

Seventh Embodiment

Figure 23:
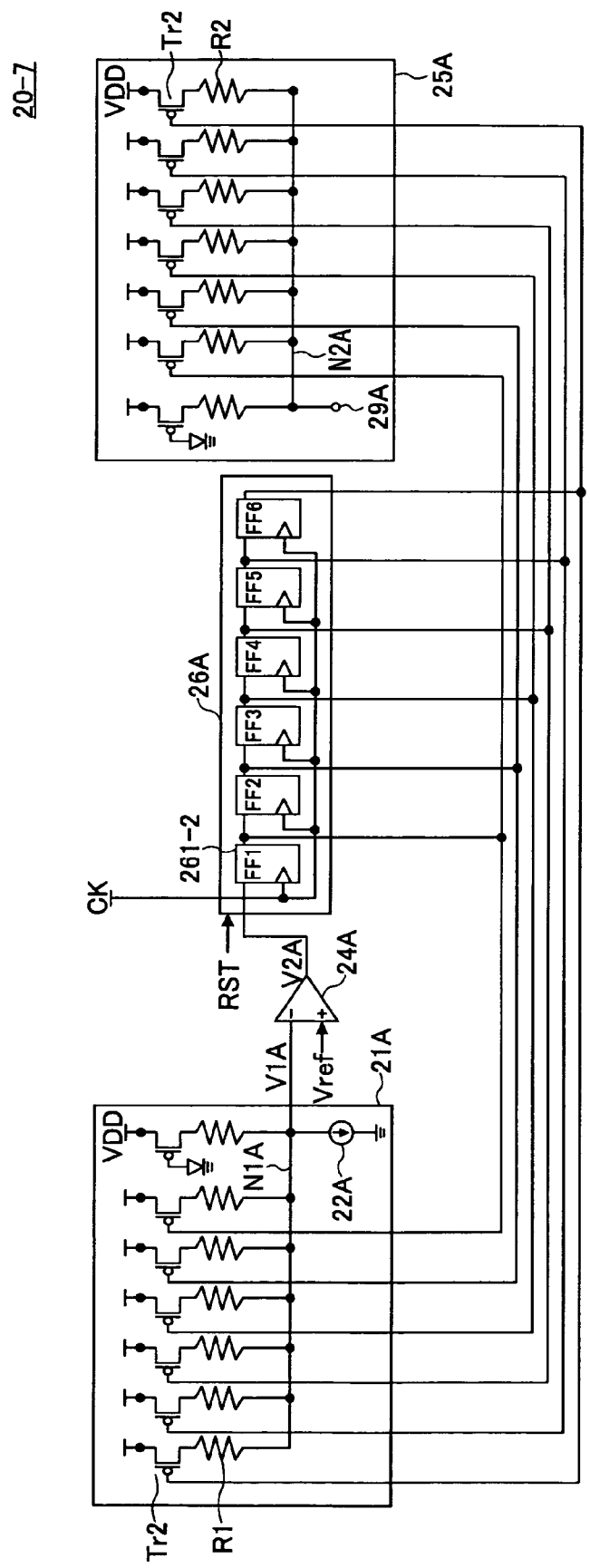
FIG. 23 is a diagram showing a seventh embodiment of the semiconductor device according to the present invention.

FIG. 23 is a diagram showing an important part of a seventh embodiment of the semiconductor device according to the present invention. This embodiment of the semiconductor device forms a transmitting and receiving system, and employs a seventh embodiment of the terminating resistance adjusting method and the semiconductor integrated circuit according to the present invention. In FIG. 23, those parts that are the same as those corresponding parts in FIG. 3 are designated by the same reference numerals, and a description thereof will be omitted.

A semiconductor device 20-7 shown in FIG. 23 includes a monitoring resistor part 21A, a current source circuit 22A, a comparator circuit 24A, a terminating resistor part 25A, a shift register part 26A, and an external terminal 29A. The external terminal 29A connects to another transmitting and receiving system, that is, another semiconductor device, via a transmission line or a transmission path (not shown). In FIG. 23, VDD denotes a power supply voltage.

The monitoring resistor part 21A and the terminating resistor part 25A have the same structure, and include a plurality of resistors R1 or R2 that are connected in parallel depending on ON/OFF states of corresponding pMOS transistors Tr2. In each of the resistor parts 21A and 25A, the number of resistors R1 or R2 that are connected in parallel, that is, the resistance of each of the resistor parts 21A and 25A, is controlled by the shift register part 26A that controls the ON/OFF states of the pMOS transistors Tr2. In this embodiment and the embodiments described later, it is assumed for the sake of convenience that the monitoring resistor part 21A has seven resistors R1, and that one of the seven resistors R1 is fixedly connected between a node N1A and the power supply voltage VDD while the remaining six resistors R1 are selectively connected between the node N1A and the power supply voltage VDD. However, the number of resistors R1 is of course not limited to seven. Similarly, it is assumed for the sake of convenience that the terminating resistor part 25A has seven resistors R2, and that one of the seven resistors R2 is fixedly connected between a node N2A, which connects to the external terminal 29A, and the power supply voltage VDD while the remaining six resistors R2 are selectively connected between the node N2A and the power supply voltage VDD. When inconsistencies introduced during the production process are taken into consideration, it is preferable that the resistances of each of the resistors R1 and R2 are the same. However, if the resistances of the corresponding resistors R1 and R2 between the resistor parts 21A and 25A fall within a predetermined integer ratio, it is possible to provide resistors R1 and R2 having different resistances within the resistor parts 21A and 25A.

Figure 24A:
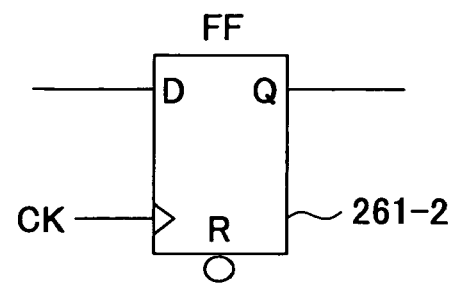
FIGS. 24A and 24B are diagrams for explaining a flip-flop forming the shift register part.
Figure 24B:
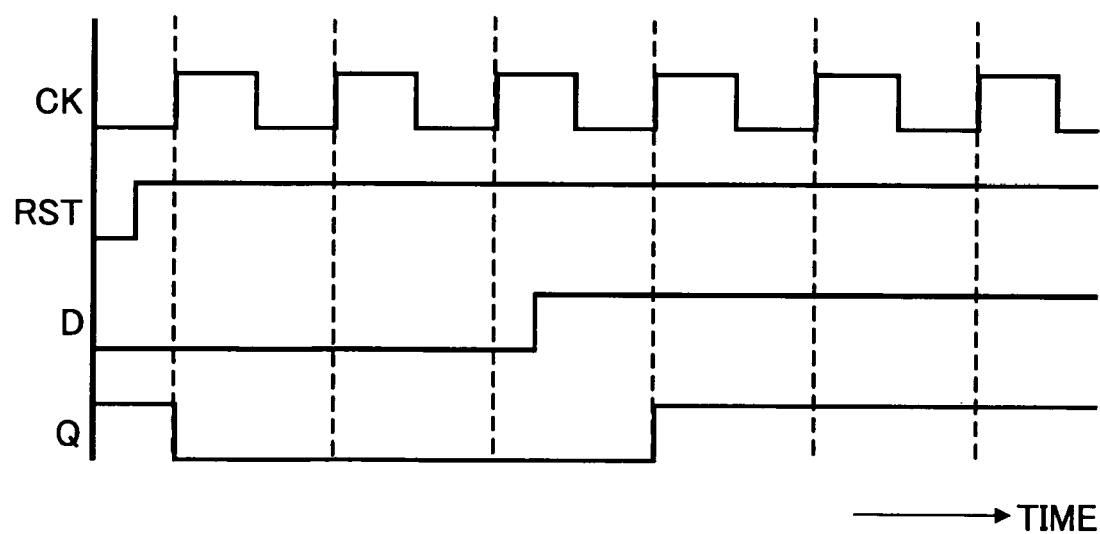

In this embodiment, the shift register part 26A has six flip-flops 261-2 that are connected in series to match the number of resistors R1 and R2 selectively connectable in each of the resistor parts 21A and 25A. FIGS. 24A and 24B are diagrams for explaining the flip-flop (FF) 261-2 forming the shift register part 26A. FIG. 24A shows the flip-flop 261-2, and FIG. 24B shows waveforms of a clock signal CK input to a clock terminal, a reset signal RST input to a reset terminal R, a signal D input to an input terminal D, and a signal Q output from an output terminal Q of the flip-flop 261-2. The shift register part 26A of this embodiment corresponds to the control part 16 shown in FIG. 2.

When making the calibration in the system initializing state or the idle state, the reference voltage Vref and the voltage V1A at the node N1A that connects the current supply circuit 22A and the resistors R1 of the monitoring resistor part 21A are input to the comparator circuit 24A. A signal V2A indicating a comparison result is output from the comparator circuit 24A and is supplied to the shift register part 26A. The shift register part 26A controls the number of pMOS transistors Tr2 that is turned ON or OFF until the signal V2A output from the comparator circuit 24A indicates that the voltage V1A is equal to the reference voltage Vref. Since the reference voltage Vref is set so that the resistance of the monitoring resistor part 21A becomes the desired value, the resistance of the monitoring resistor part 21A is controlled to the desired value in the state where the voltage V1A is equal to the reference voltage Vref. The clock signal CK is input to the shift register part 26A until the voltage V1A becomes equal to the reference voltage Vref, and the pulse of the clock signal CK is fixed to a low level (logical value "0"), for example, when the resistance of the monitoring resistor part 21A becomes the desired value. For this reason, in this state, the resistance of the terminating resistor part 25A is also controlled to the desired value, that is, to the optimum value.

Figure 25:
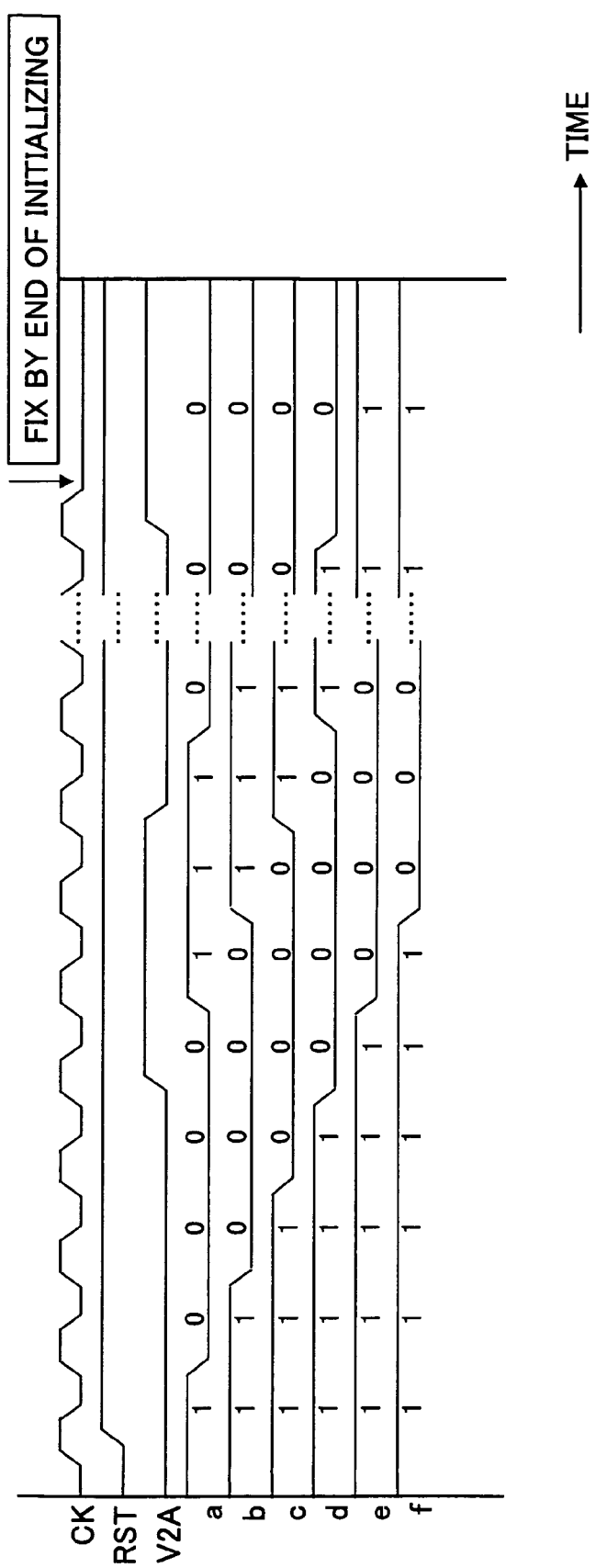
FIG. 25 is a timing chart for explaining the operation of the seventh embodiment in an initializing state.
Figure 26:
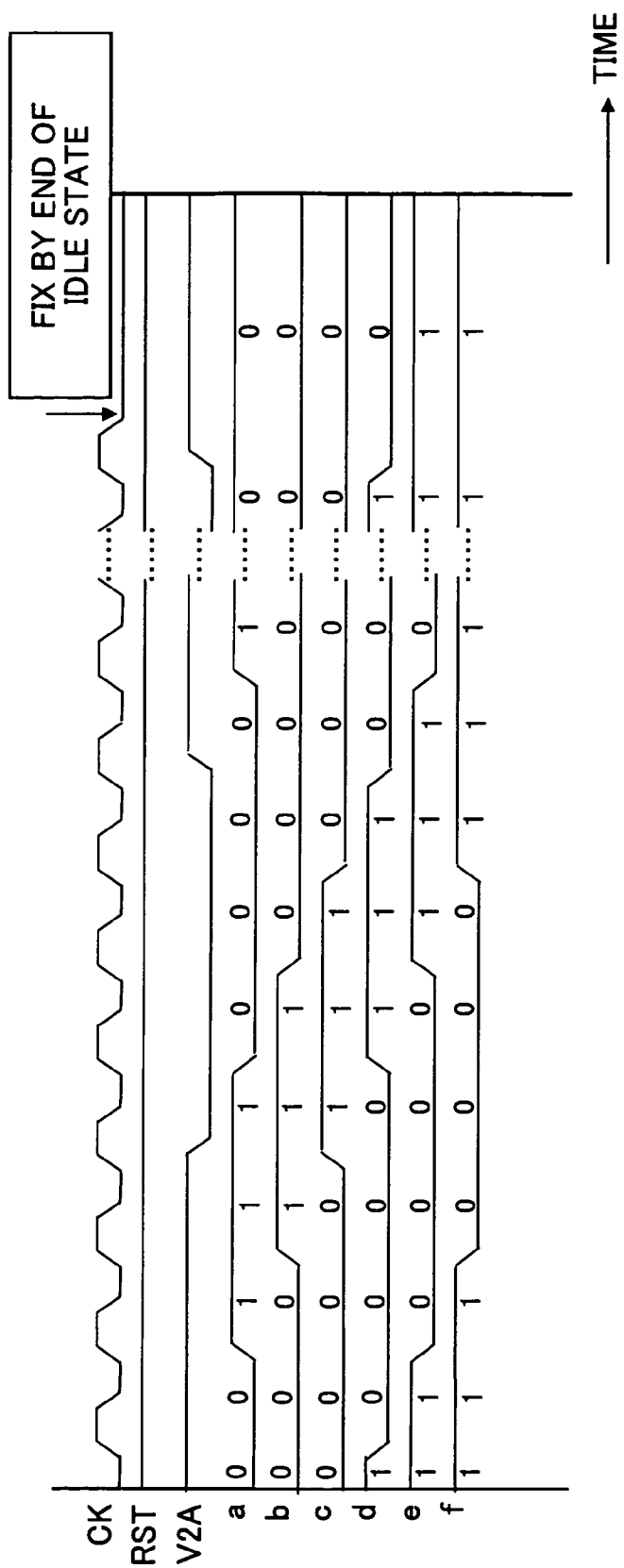
FIG. 26 is a timing chart for explaining the operation of the seventh embodiment in the idle state.

FIG. 25 is a timing chart for explaining the operation of the seventh embodiment in the initializing state, and FIG. 26 is a timing chart for explaining the operation of the seventh embodiment in the idle state. In FIGS. 25 and 26 and the timing charts which will be described later, the output signals Q of the flip-flop 261-2 provided at the first stage through the flip-flop 261-2 provided at the sixth stage of the shift register part 26A are respectively indicated by "a" through "f". In addition, numerals "0" and "1" indicated above and below the waveform indicate the logical values.

Therefore, by controlling the actual resistance of the monitoring resistor part 21A to become the desired value when making the calibration, the actual resistance of the terminating resistor part 25A which has the same structure as the monitoring resistor part 21A is also similarly controlled to the desired value, to thereby accurately control and set the actual resistance of the terminating resistor part 25A. Moreover, since it is unnecessary to supply a current directly to the transmission line that is connected to the external terminal 29A when making the calibration, it is possible to make an accurate calibration that is closed within the semiconductor device 20-7, with respect to the terminating resistor part 25A that is provided within the semiconductor device 20-7.

In this embodiment, the calibration cannot be made in a state where the semiconductor device 20-7 is making the data transmission and/or the data reception, that is, in a state where the semiconductor device 20-7 is making the communicating operation.

Eighth Embodiment

Figure 27:
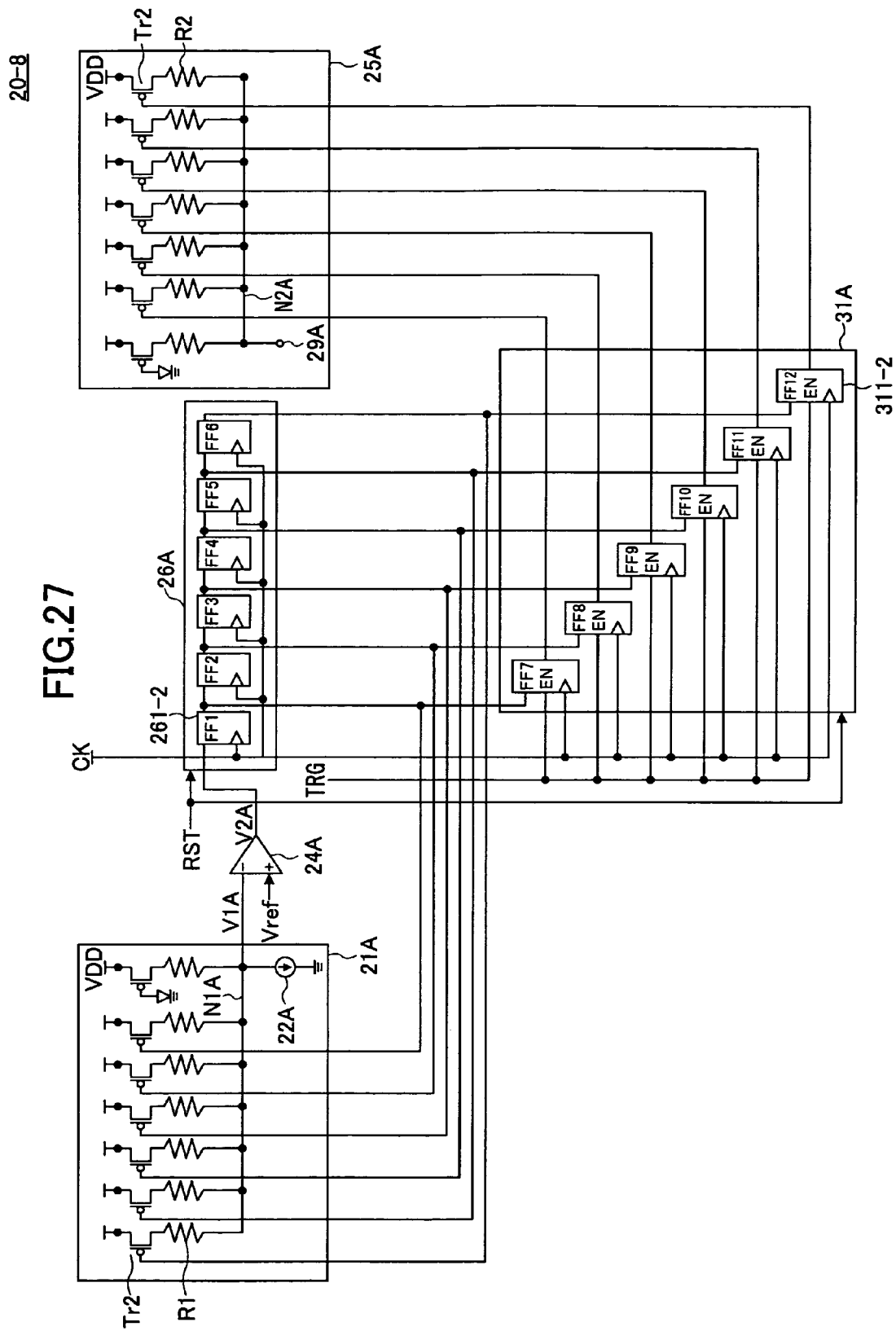
FIG. 27 is a diagram showing an eighth embodiment of the semiconductor device according to the present invention.

FIG. 27 is a diagram showing an important part of an eighth embodiment of the semiconductor device according to the present invention. This embodiment of the semiconductor device forms a transmitting and receiving system, and employs an eighth embodiment of the terminating resistance adjusting method and the semiconductor integrated circuit according to the present invention. In FIG. 27, those parts that are the same as those corresponding parts in FIG. 23 are designated by the same reference numerals, and a description thereof will be omitted.

Figure 28A:
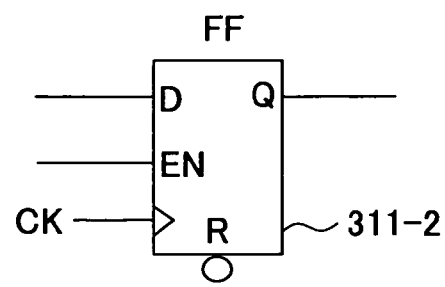
FIGS. 28A and 28B are diagrams for explaining a flip-flop forming the timing control part.
Figure 28B:
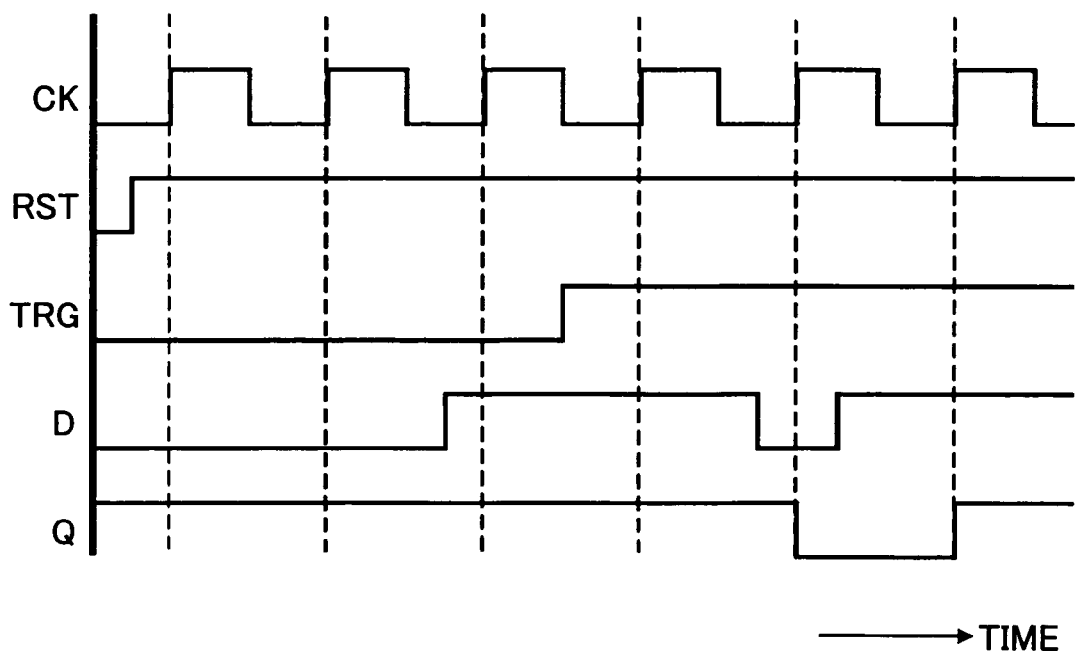

In this embodiment, a semiconductor device 20-8 includes a timing control part 31A for controlling a resistance control timing of the terminating resistor part 25A based on a trigger signal TRG. The timing control part 31A has six flip-flops 311-2 that are connected as shown in FIG. 27 to match the number of resistors R2 selectively connectable in the terminating resistor part 25A. FIGS. 28A and 28B are diagrams for explaining the flip-flop (FF) 311-2 forming the timing control part 31A. FIG. 28A shows the flip-flop 311-2, and FIG. 28B shows waveforms of a clock signal CK input to a clock terminal, a reset signal RST input to a reset terminal R, the trigger signal TRG input to an enable terminal EN, a signal D input to an input terminal D, and a signal Q output from an output terminal Q of the flip-flop 311-2. The shift register part 26A and the timing control part 31A of this embodiment corresponds to the control part 16 shown in FIG. 2.

Figure 29:
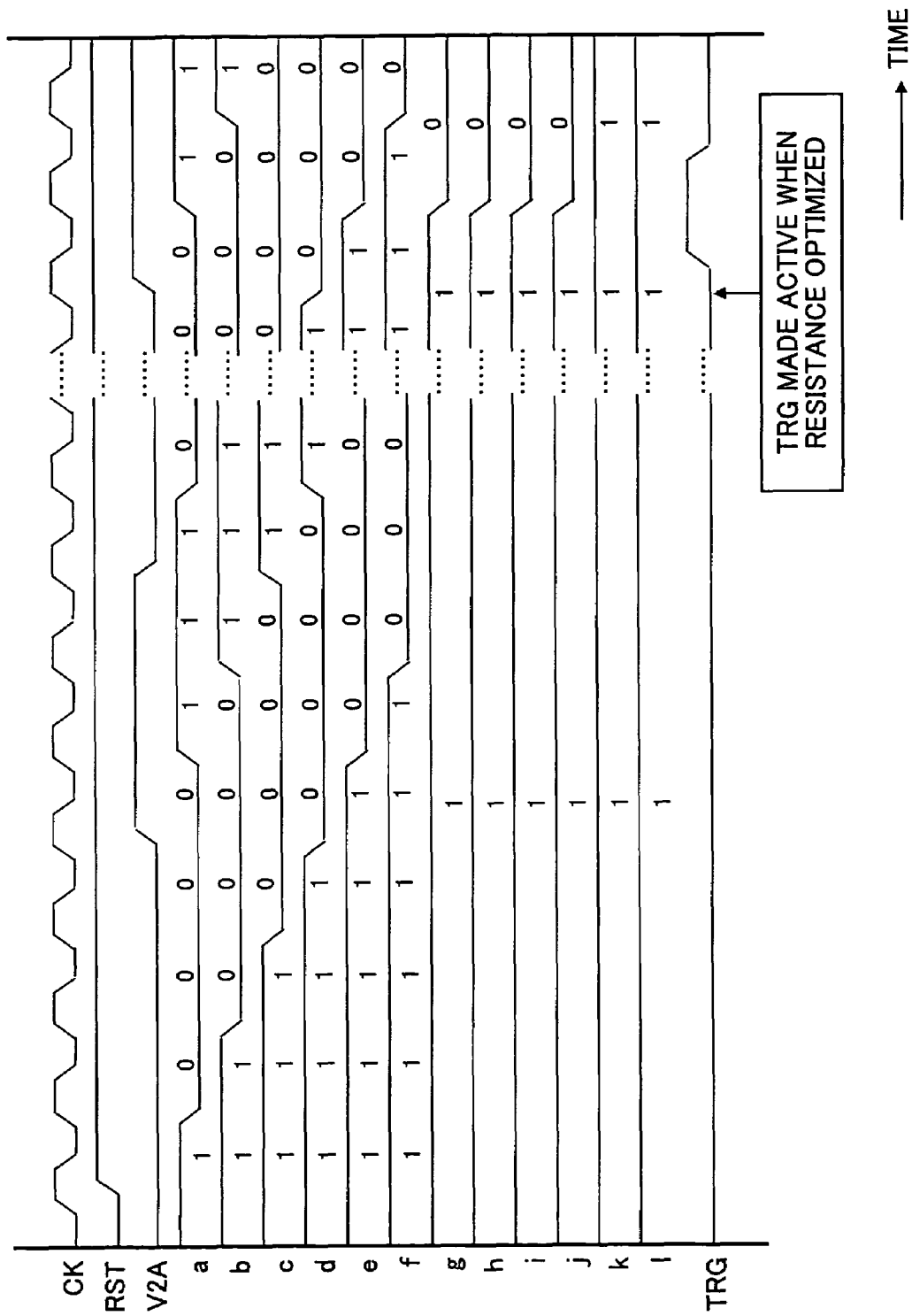
FIG. 29 is a timing chart for explaining the operation of the eighth embodiment in the initializing state.
Figure 30:
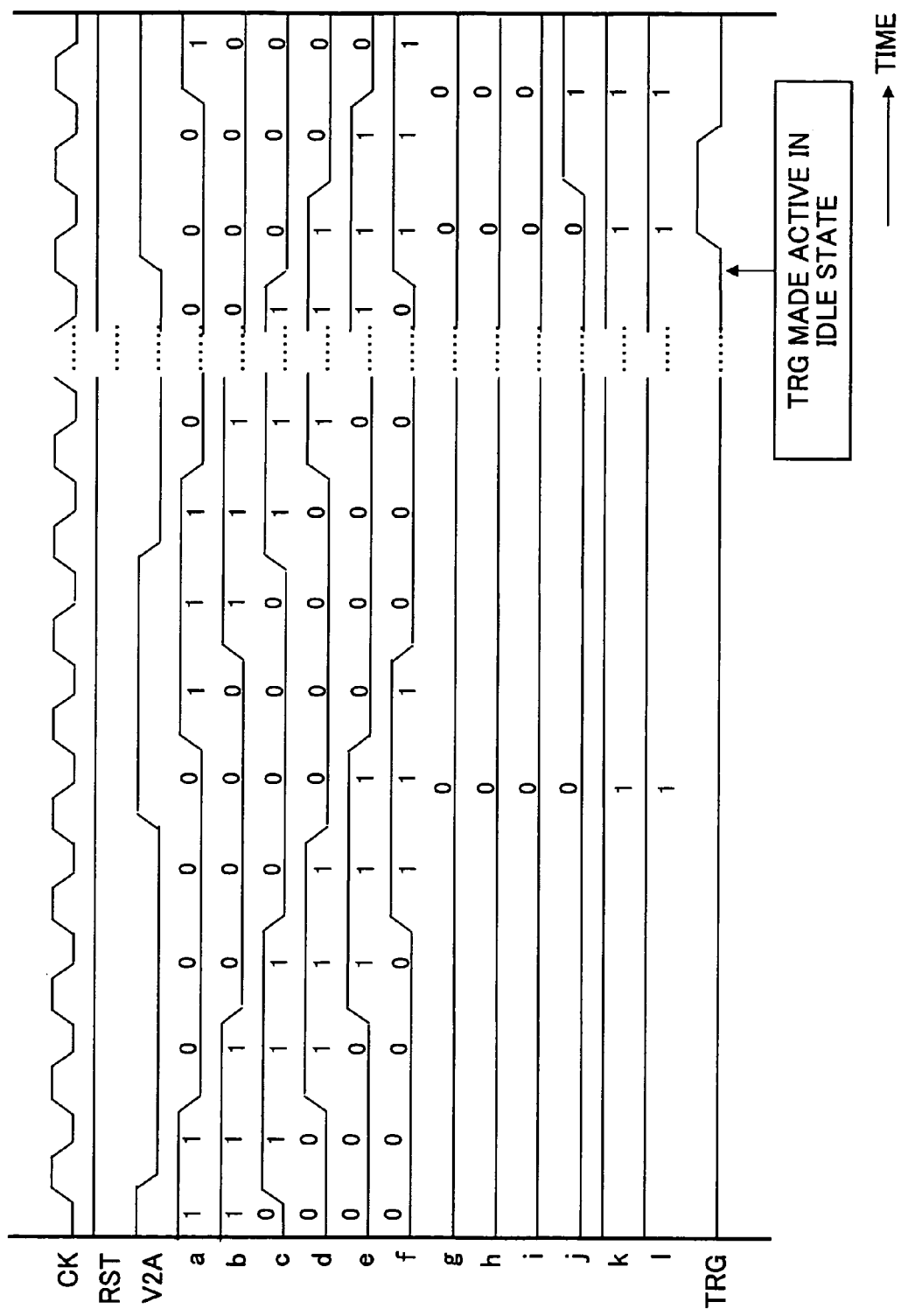
FIG. 30 is a timing chart for explaining the operation of the eighth embodiment in the idle state or the communicating state.

FIG. 29 is a timing chart for explaining the operation of the eighth embodiment in the initializing state, and FIG. 30 is a timing chart for explaining the operation of the eighth embodiment in the idle state or the communicating state.

The output signal of the shift register part 26A is supplied to the terminating resistor part 25A after being input to the timing control part 31A in response to the trigger signal TRG which is high-active. Since the control and setting of the resistance of the terminating resistor part 25A are made in the idle state in response to the trigger signal TRG, it becomes possible to constantly input the clock signal CK to the shift register part 26A, and the resistance of the monitoring resistor part 21A can be constantly controlled and set to the desired value. In other words, this embodiment can make the calibration even in the state where the semiconductor device 20-8 is making the data transmission and/or the data reception, that is, even in the state where the semiconductor device 20-8 is making the communicating operation.

Ninth Embodiment

Figure 31:
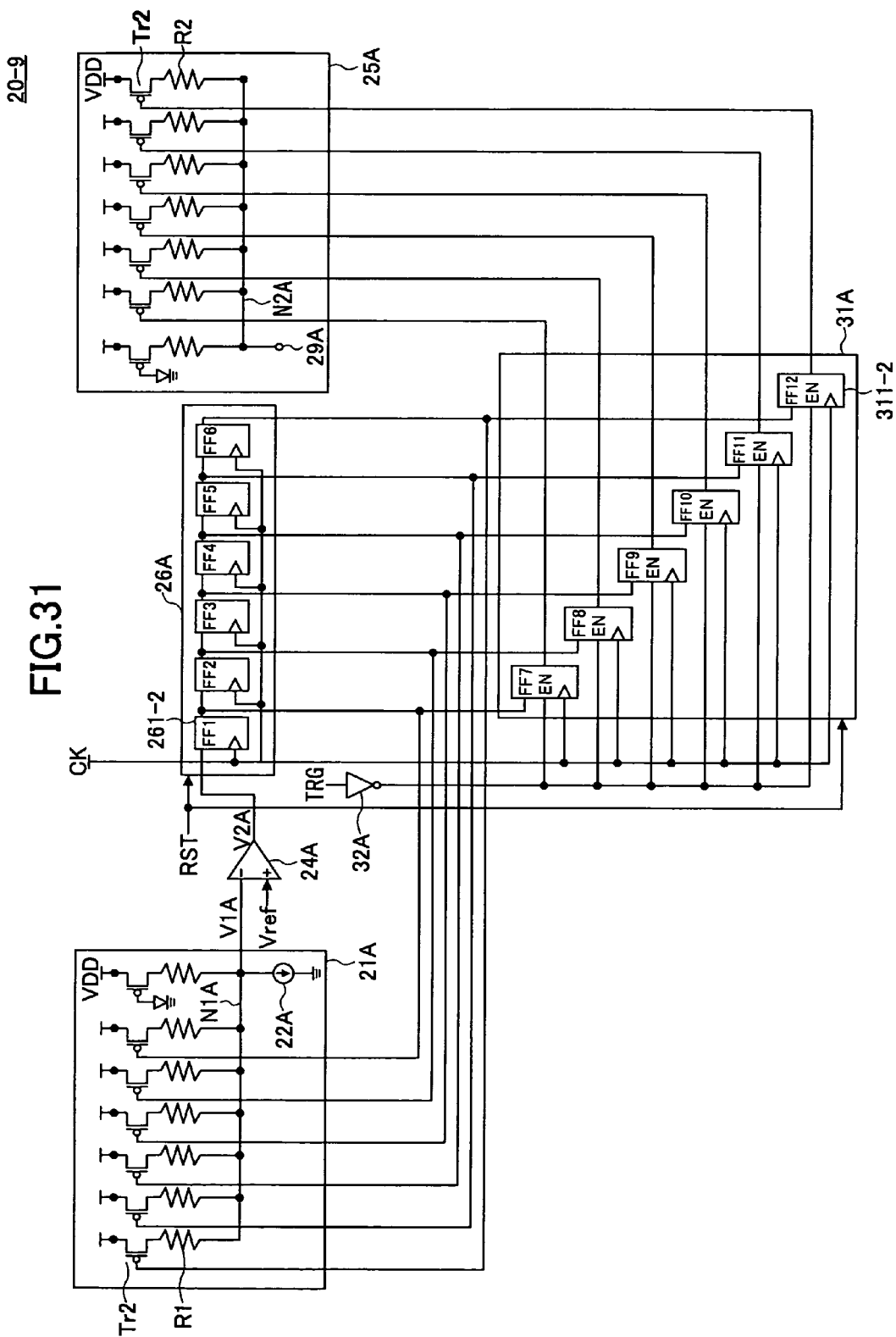
FIG. 31 is a diagram showing a ninth embodiment of the semiconductor device according to the present invention.

FIG. 31 is a diagram showing an important part of a ninth embodiment of the semiconductor device according to the present invention. This embodiment of the semiconductor device forms a transmitting and receiving system, and employs a ninth embodiment of the terminating resistance adjusting method and the semiconductor integrated circuit according to the present invention. In FIG. 31, those parts that are the same as those corresponding parts in FIG. 27 are designated by the same reference numerals, and a description thereof will be omitted.

In this embodiment, a semiconductor device 20-9 includes an inverter 32A, and a timing control part 31A for controlling a resistance control timing of the terminating resistor part 25A based on a trigger signal TRG. The timing control part 31A has six flip-flops 311-2 that are connected as shown in FIG. 31 to match the number of resistors R2 selectively connectable in the terminating resistor part 25A. The shift register part 26A and the timing control part 31A of this embodiment corresponds to the control part 16 shown in FIG. 2.

Figure 32:
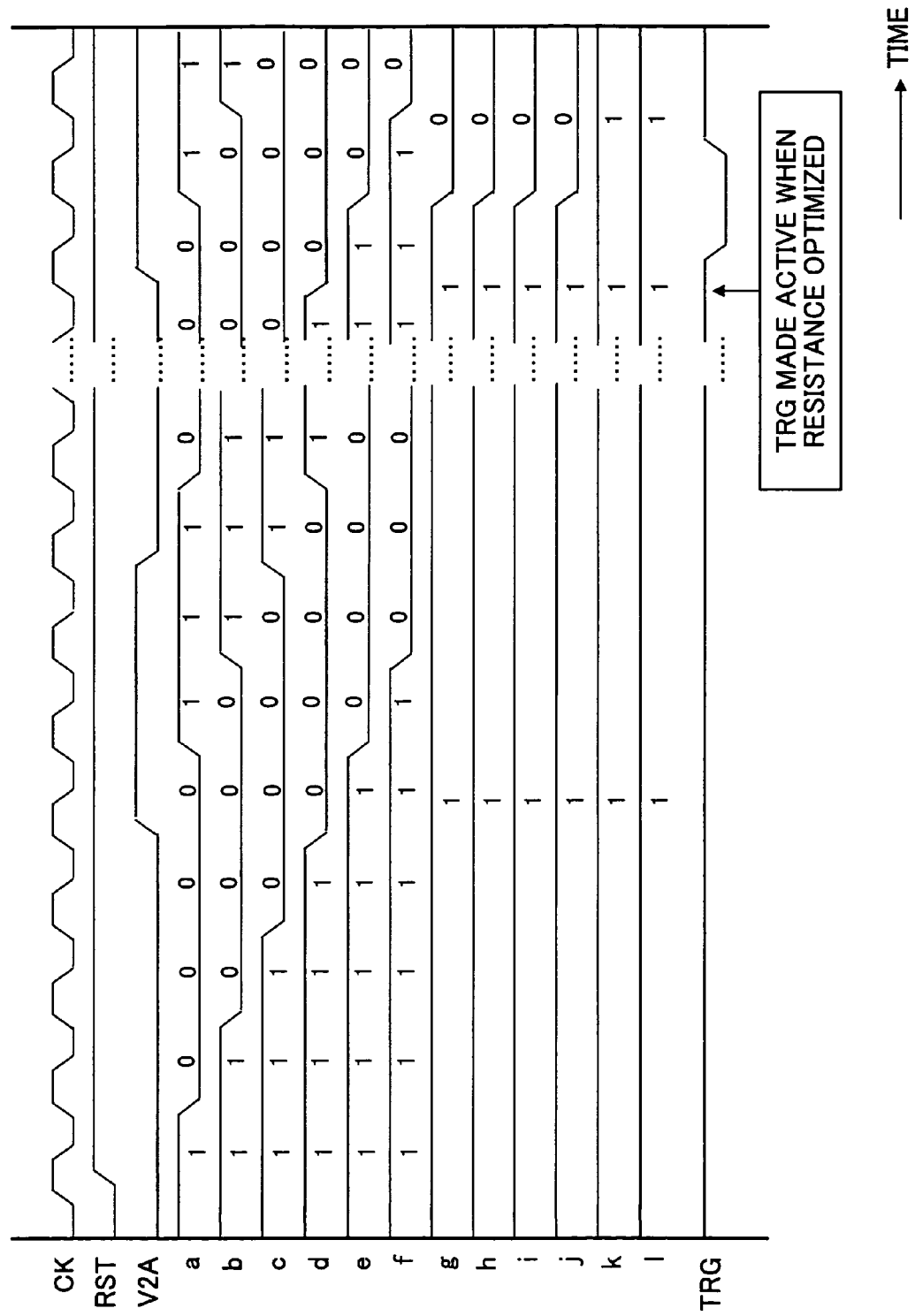
FIG. 32 is a timing chart for explaining the operation of the ninth embodiment in the initializing state.
Figure 33:
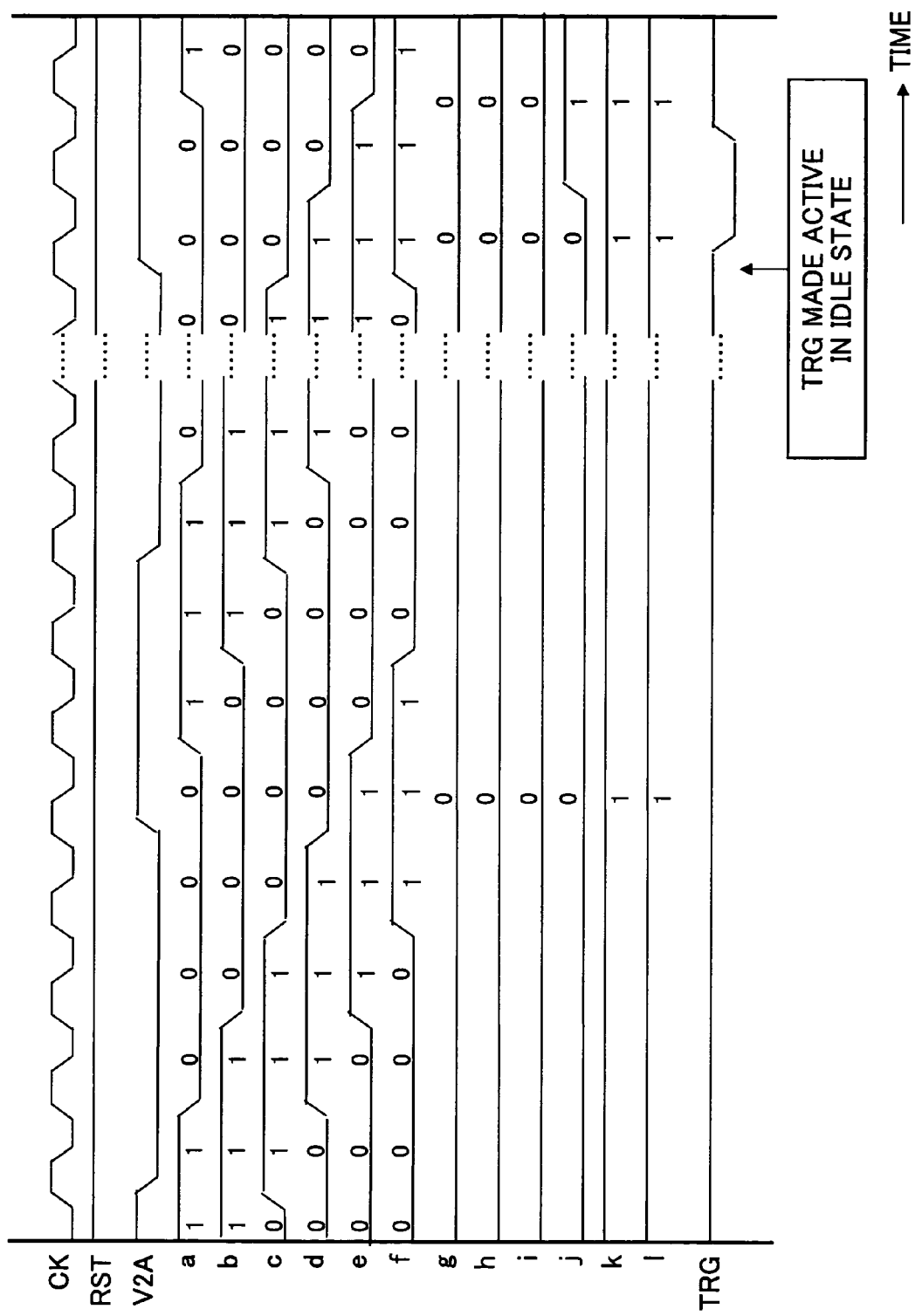
FIG. 33 is a timing chart for explaining the operation of the ninth embodiment in the idle state or the communicating state.

FIG. 32 is a timing chart for explaining the operation of the ninth embodiment in the initializing state, and FIG. 33 is a timing chart for explaining the operation of the ninth embodiment in the idle state or the communicating state.

The output signal of the shift register part 26A is supplied to the terminating resistor part 25A after being input to the timing control part 31A in response to the trigger signal TRG which is low-active and is obtained via the inverter 32A. Since the control and setting of the resistance of the terminating resistor part 25A are made in the idle state in response to the trigger signal TRG, it becomes possible to constantly input the clock signal CK to the shift register part 26A, and the resistance of the monitoring resistor part 21A can be constantly controlled and set to the desired value. In other words, this embodiment can make the calibration even in the state where the semiconductor device 20-9 is making the data transmission and/or the data reception, that is, even in the state where the semiconductor device 20-9 is making the communicating operation.

Tenth Embodiment

Figure 34:
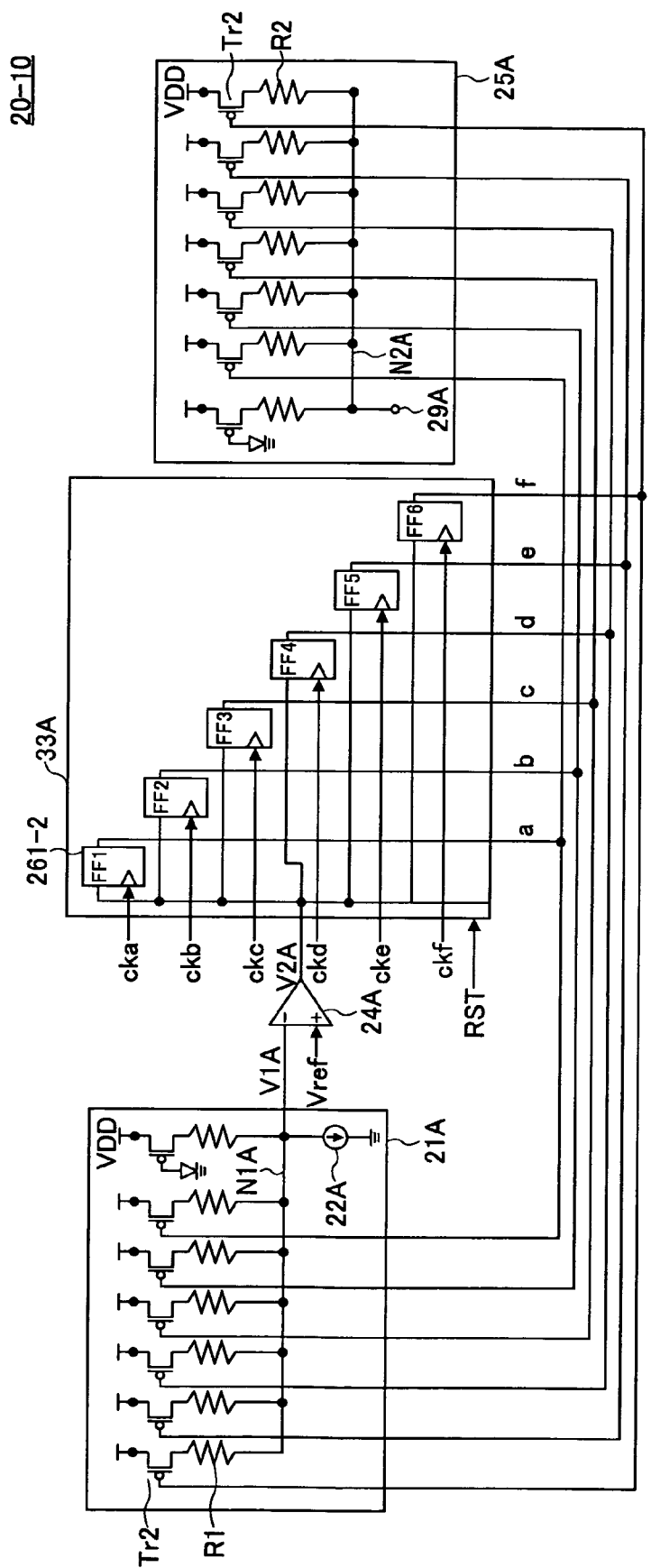
FIG. 34 is a diagram showing a tenth embodiment of the semiconductor device according to the present invention.

FIG. 34 is a diagram showing an important part of a tenth embodiment of the semiconductor device according to the present invention. This embodiment of the semiconductor device forms a transmitting and receiving system, and employs a tenth embodiment of the terminating resistance adjusting method and the semiconductor integrated circuit according to the present invention. In FIG. 34, those parts that are the same as those corresponding parts in FIG. 23 are designated by the same reference numerals, and a description thereof will be omitted.

In this embodiment, a semiconductor device 20-10 includes a shift register part 33A that is input with clock signals cka through ckf having six phases. The phases of the clock signals cka through ckf are mutually different. The shift register part 33A has six flip-flops 261-2 that are connected in parallel as shown in FIG. 34 to match the number of resistors R1 and R2 selectively connectable in each of the resistor parts 21A and 25A. The shift register part 33A of this embodiment corresponds to the control part 16 shown in FIG. 2.

Figure 35:
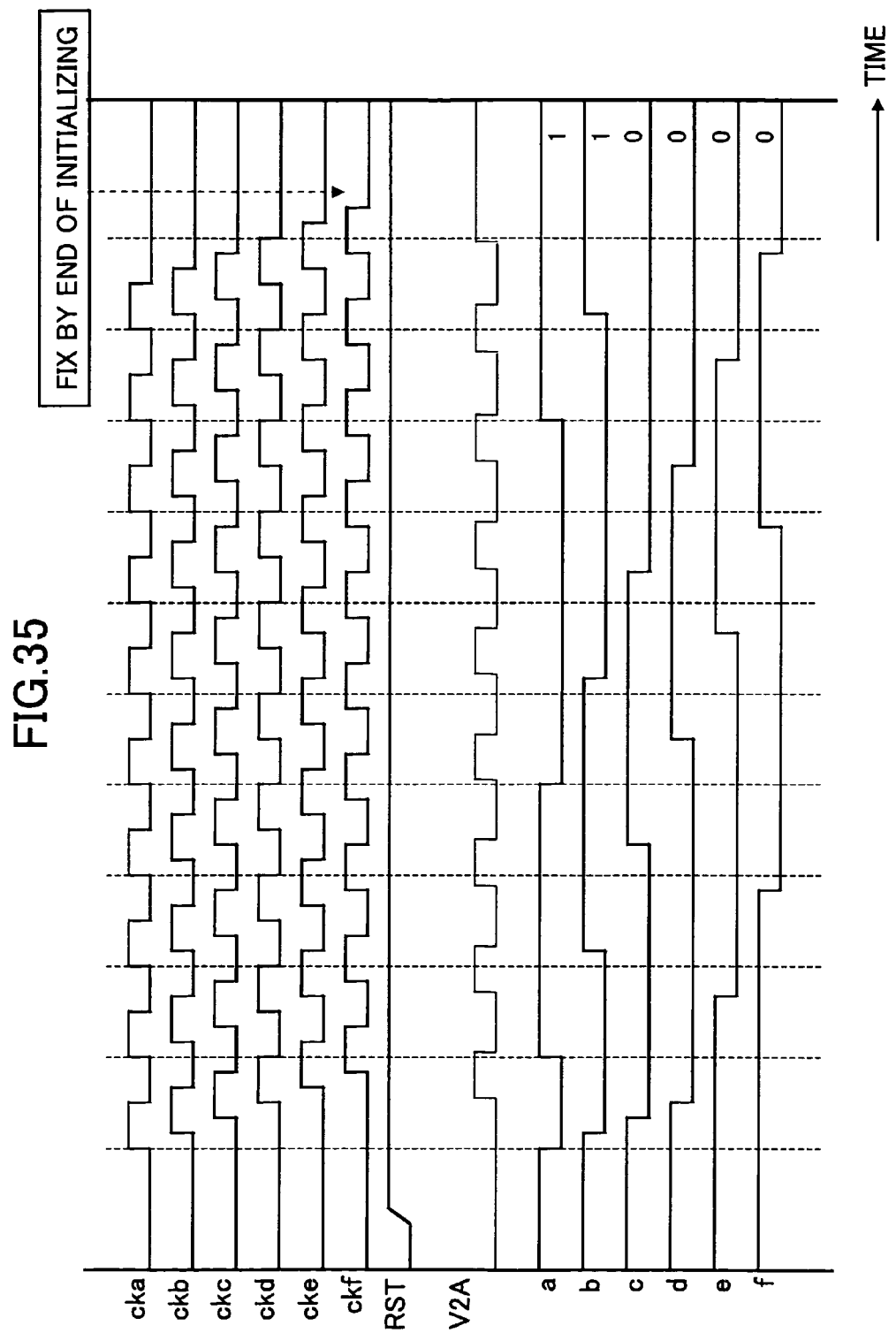
FIG. 35 is a timing chart for explaining the operation of the tenth embodiment in the initializing state.
Figure 36:
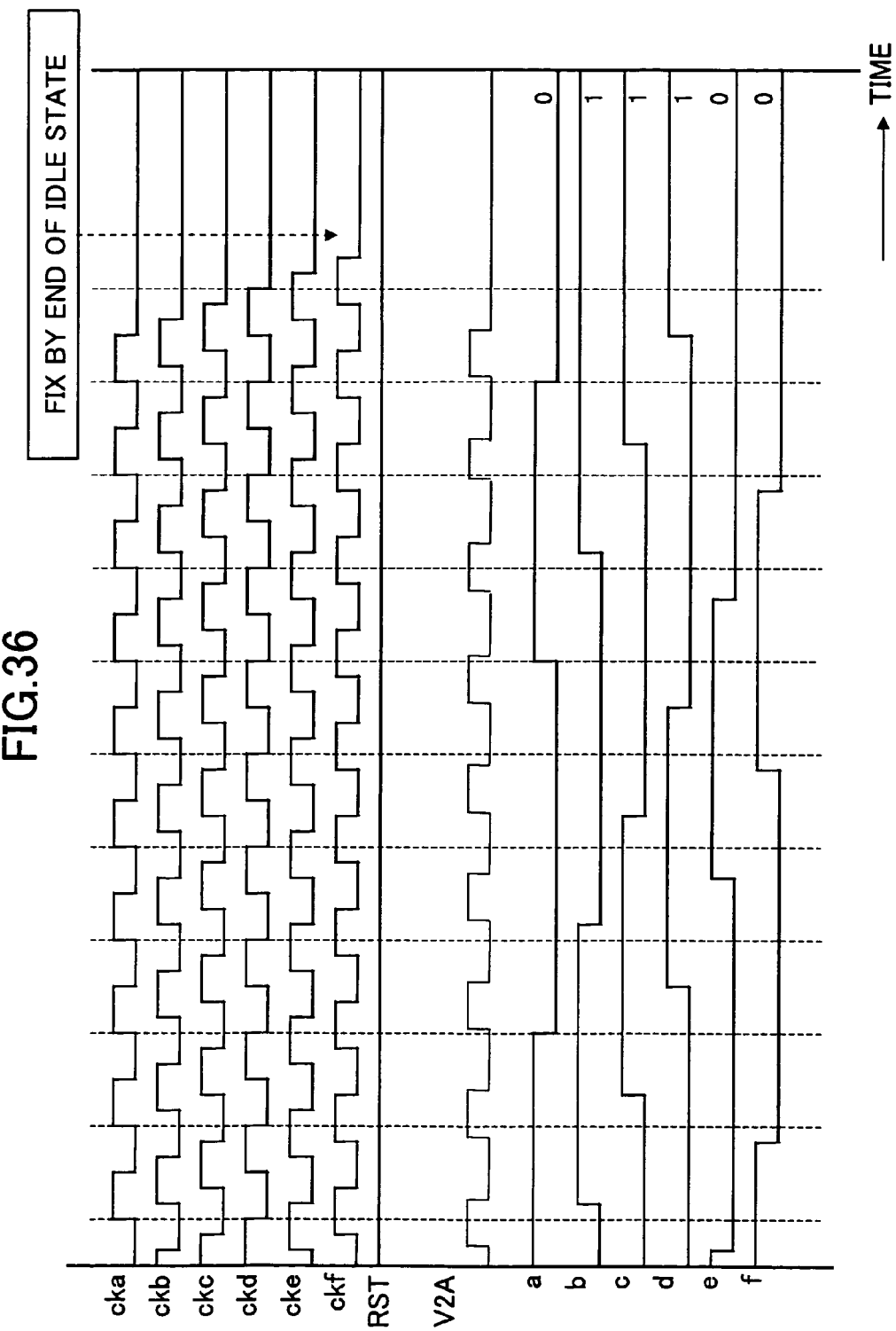
FIG. 36 is a timing chart for explaining the operation of the tenth embodiment in the idle state.

FIG. 35 is a timing chart for explaining the operation of the tenth embodiment in the initializing state, and FIG. 36 is a timing chart for explaining the operation of the tenth embodiment in the idle state.

Similarly as in the case of the seventh embodiment described above, the calibration can be made in the initializing state or the idle state of the semiconductor device 20-10, but the calibration cannot be made in a state where the semiconductor device 20-10 is making the data transmission and/or the data reception, that is, in a state where the semiconductor device 20-10 is making the communicating operation.

Eleventh Embodiment

Figure 37:
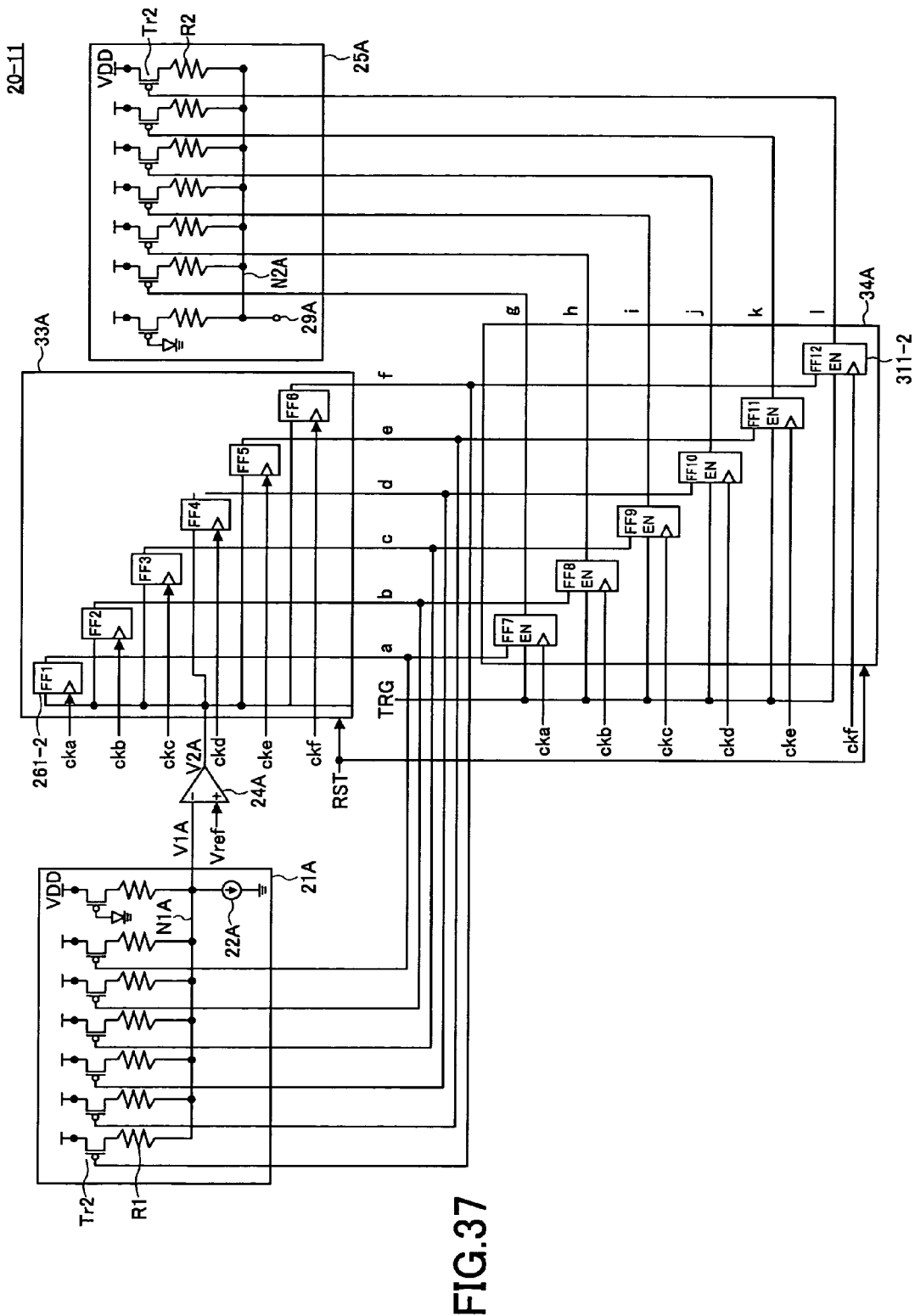
FIG. 37 is a diagram showing an eleventh embodiment of the semiconductor device according to the present invention.

FIG. 37 is a diagram showing an important part of an eleventh embodiment of the semiconductor device according to the present invention. This embodiment of the semiconductor device forms a transmitting and receiving system, and employs an eleventh embodiment of the terminating resistance adjusting method and the semiconductor integrated circuit according to the present invention. In FIG. 37, those parts that are the same as those corresponding parts in FIG. 34 are designated by the same reference numerals, and a description thereof will be omitted.

In this embodiment, a semiconductor device 20-11 includes a timing control part 34A for controlling a resistance control timing of the terminating resistor part 25A based on a trigger signal TRG. The timing control part 34A has six flip-flops 311-2 that are connected as shown in FIG. 37 to match the number of resistors R2 selectively connectable in the terminating resistor part 25A. The shift register part 33A and the timing control part 34A of this embodiment corresponds to the control part 16 shown in FIG. 2.

Figure 38:
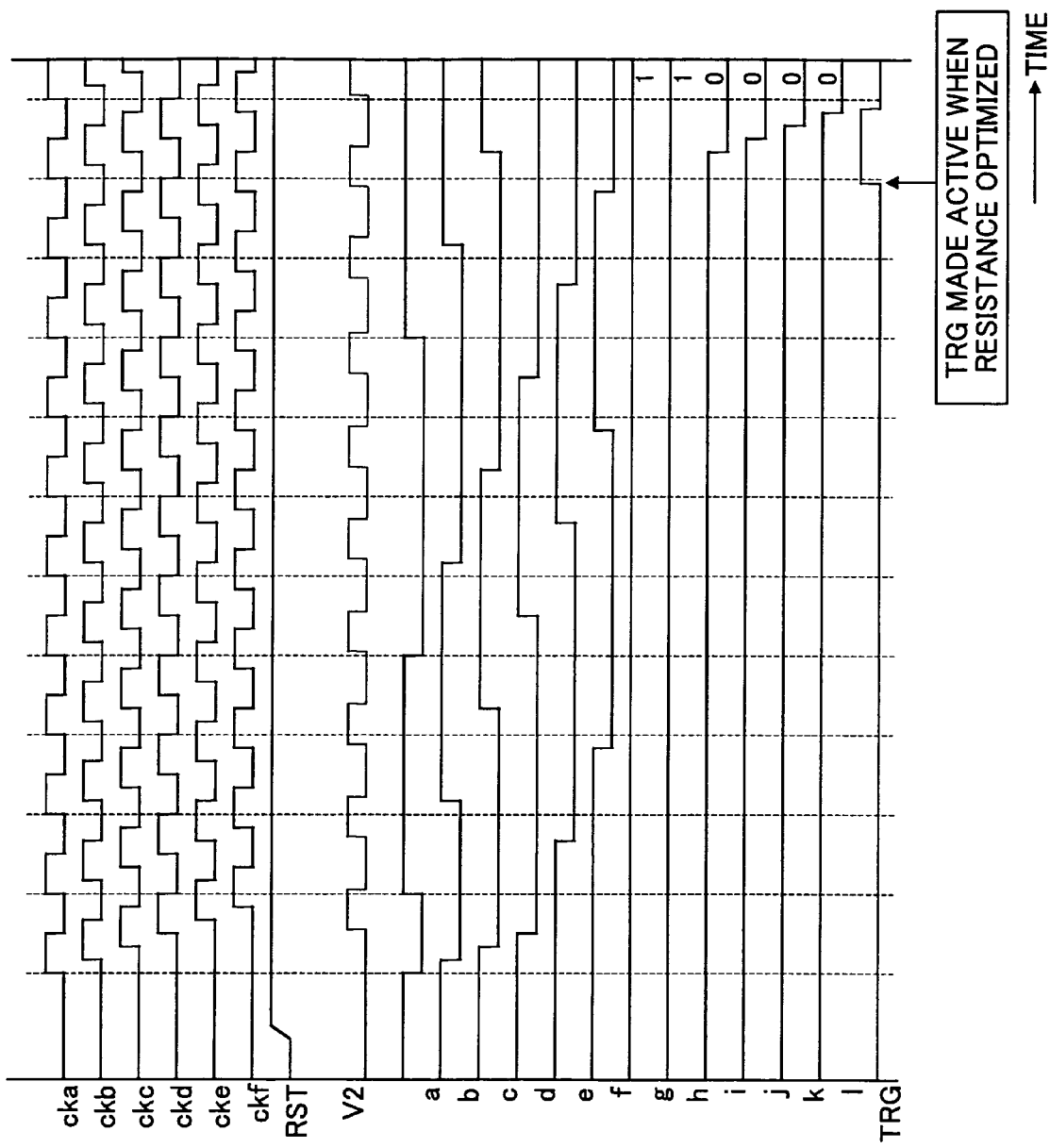
FIG. 38 is a timing chart for explaining the operation of the eleventh embodiment in the initializing state.
Figure 39:
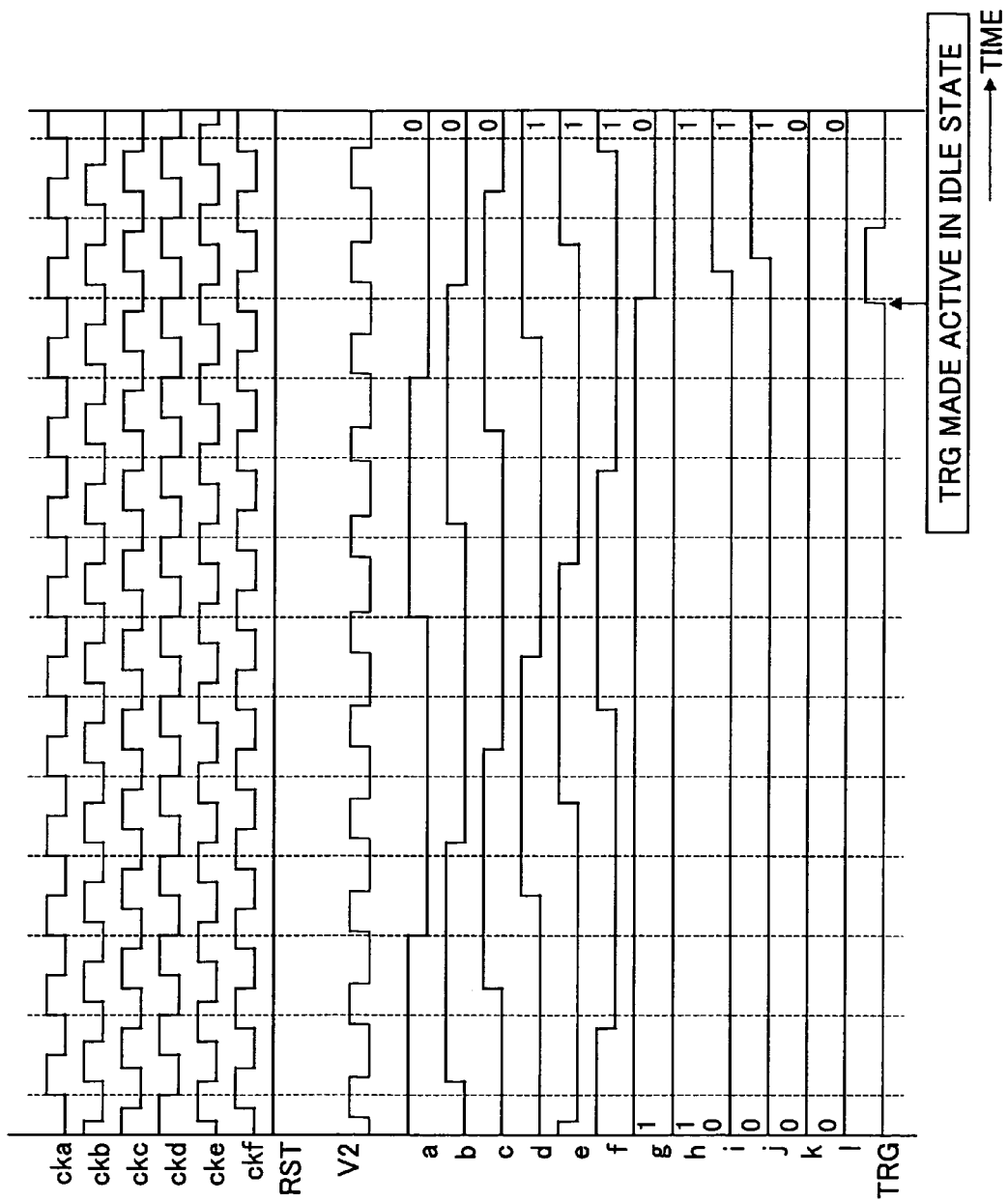
FIG. 39 is a timing chart for explaining the operation of the eleventh embodiment in the idle state or the communicating state.

FIG. 38 is a timing chart for explaining the operation of the eleventh embodiment in the initializing state, and FIG. 39 is a timing chart for explaining the operation of the eleventh embodiment in the idle state or the communicating state.

The output signal of the shift register part 33A is supplied to the terminating resistor part 25A after being input to the timing control part 34A in response to the trigger signal TRG which is high-active. Since the control and setting of the resistance of the terminating resistor part 25A are made in the idle state in response to the trigger signal TRG, it becomes possible to constantly input the clock signal CK to the shift register part 33A, and the resistance of the monitoring resistor part 21A can be constantly controlled and set to the desired value. In other words, this embodiment can make the calibration even in the state where the semiconductor device 20-11 is making the data transmission and/or the data reception, that is, even in the state where the semiconductor device 20-11 is making the communicating operation.

Twelfth Embodiment

Figure 40:
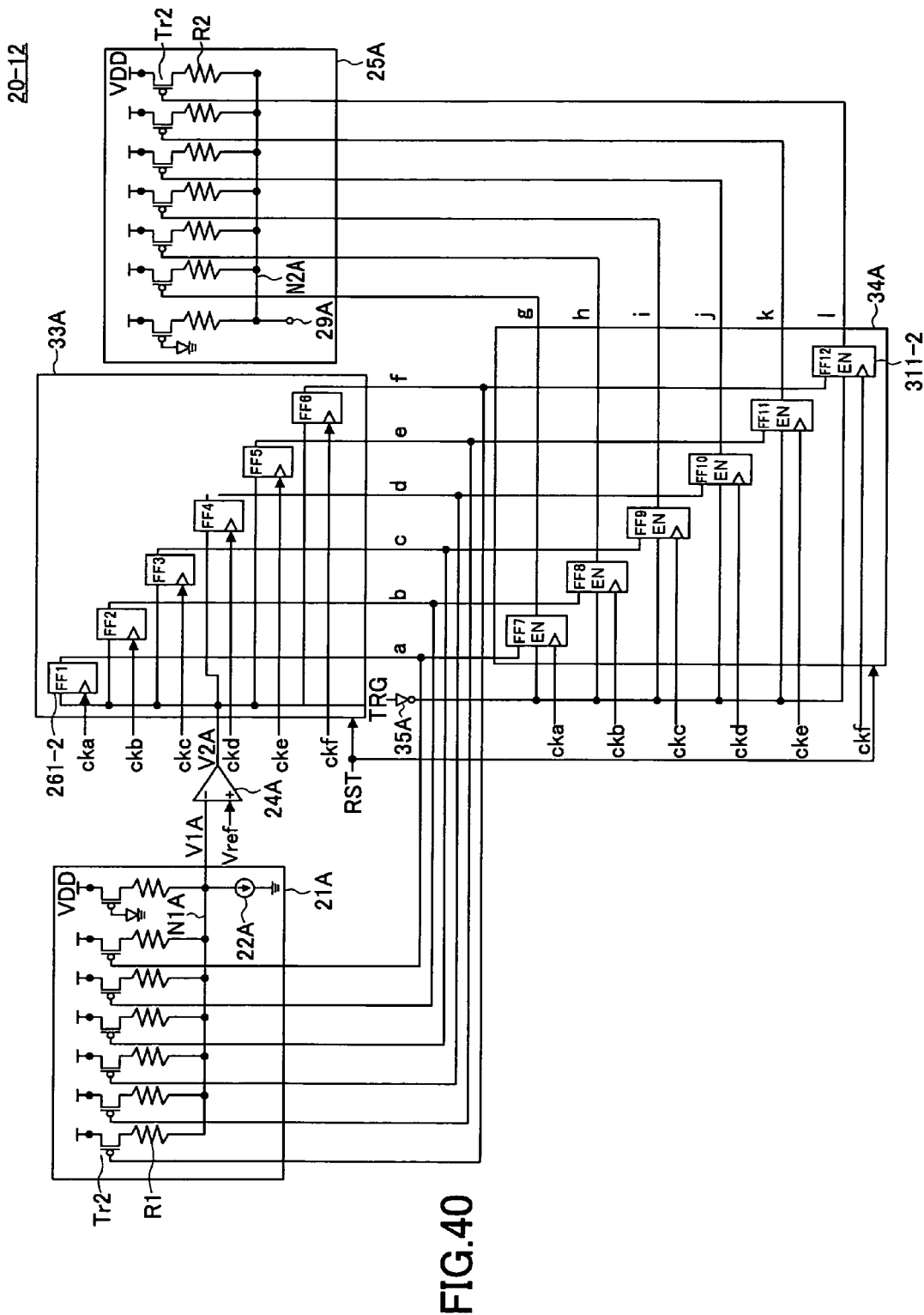
FIG. 40 is a diagram showing a twelfth embodiment of the semiconductor device according to the present invention.

FIG. 40 is a diagram showing an important part of a twelfth embodiment of the semiconductor device according to the present invention. This embodiment of the semiconductor device forms a transmitting and receiving system, and employs a twelfth embodiment of the terminating resistance adjusting method and the semiconductor integrated circuit according to the present invention. In FIG. 40, those parts that are the same as those corresponding parts in FIG. 37 are designated by the same reference numerals, and a description thereof will be omitted.

In this embodiment, a semiconductor device 20-12 includes an inverter 35A, and a timing control part 34A for controlling a resistance control timing of the terminating resistor part 25A based on a trigger signal TRG. The timing control part 34A has six flip-flops 311-2 that are connected as shown in FIG. 40 to match the number of resistors R2 selectively connectable in the terminating resistor part 25A. The shift register part 33A and the timing control part 34A of this embodiment corresponds to the control part 16 shown in FIG. 2.

Figure 41:
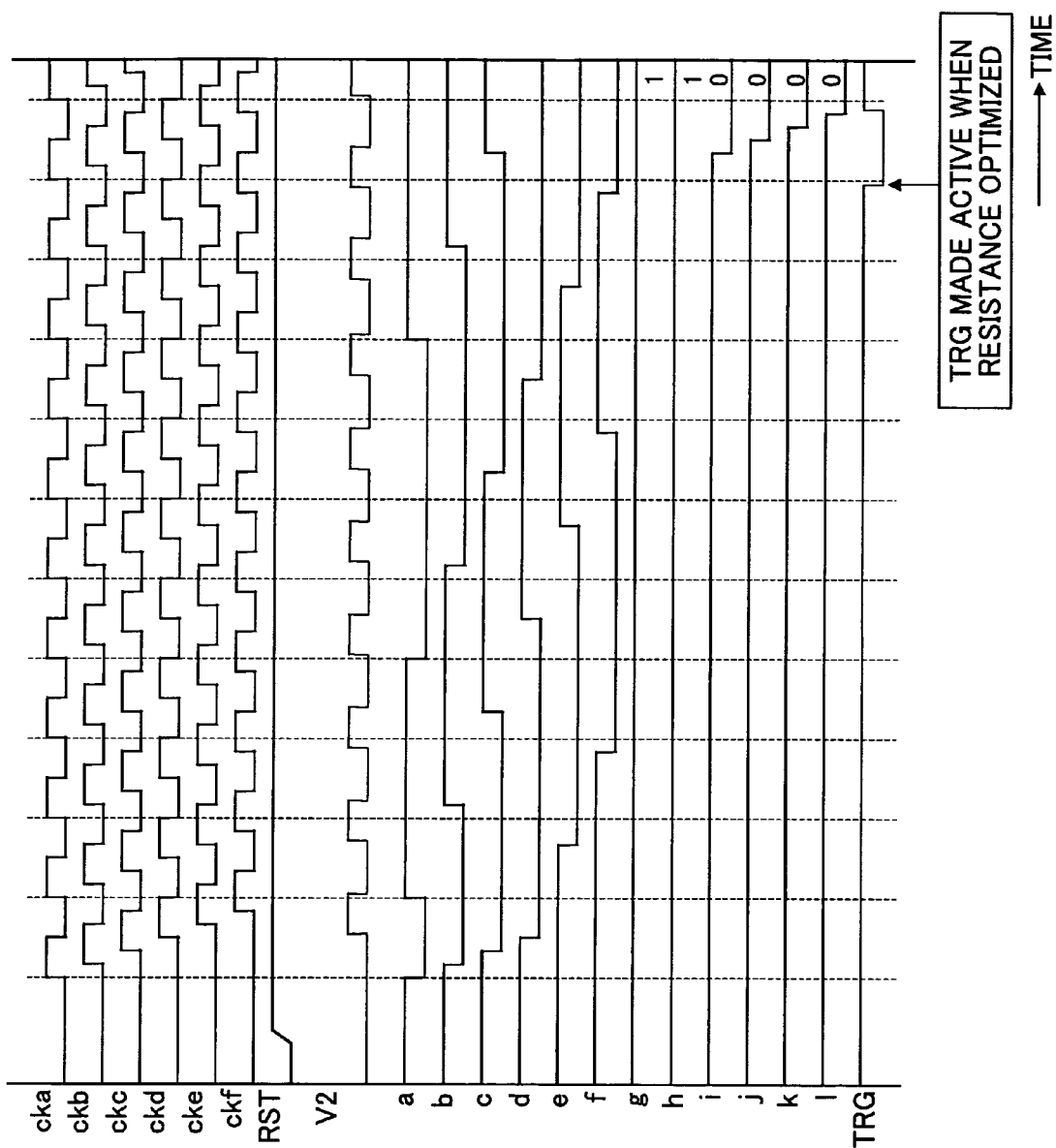
FIG. 41 is a timing chart for explaining the operation of the twelfth embodiment in the initializing state.
Figure 42:
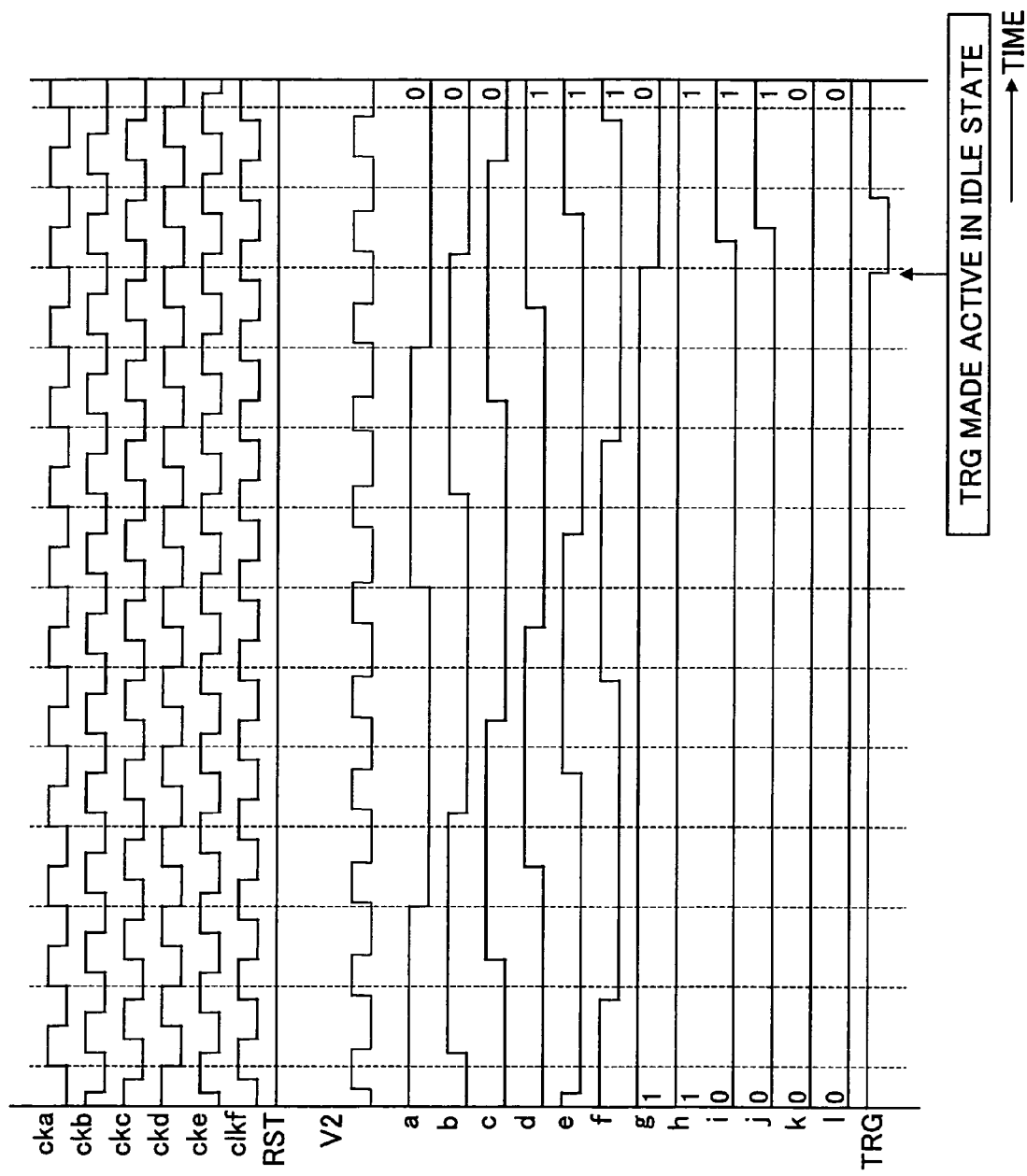
FIG. 42 is a timing chart for explaining the operation of the twelfth embodiment in the idle state or the communicating state.

FIG. 41 is a timing chart for explaining the operation of the twelfth embodiment in the initializing state, and FIG. 42 is a timing chart for explaining the operation of the twelfth embodiment in the idle state or the communicating state.

The output signal of the shift register part 33A is supplied to the terminating resistor part 25A after being input to the timing control part 34A in response to the trigger signal TRG which is low-active and is obtained via the inverter 35A. Since the control and setting of the resistance of the terminating resistor part 25A are made in the idle state in response to the trigger signal TRG, it becomes possible to constantly input the clock signal CK to the shift register part 33A, and the resistance of the monitoring resistor part 21A can be constantly controlled and set to the desired value. In other words, this embodiment can make the calibration even in the state where the semiconductor device 20-12 is making the data transmission and/or the data reception, that is, even in the state where the semiconductor device 20-12 is making the communicating operation.

[Calibration Timing and Control Timing of Terminal Resistor Part]

Next, a description will be given of the calibration timing of the semiconductor device and the control timing of the terminal resistor part. The control timing (or resistance control timing) of the terminal resistor part refers to the timing when the optimum resistance that is obtained by the calibration using the monitoring resistor part is reflected to the terminating resistor part.

The calibration timing depends upon the circuit structure of the semiconductor integrated circuit. In the first, fourth, seventh and tenth embodiments described above, the calibration can be made in the initializing state or the idle state of the semiconductor device.

On the other hand, in the second, third, fifth, sixth, eighth, ninth, eleventh and twelfth embodiments described above, the calibration can be made in each of the initial state, the idle state and the communicating state of the semiconductor device. In other words, the calibration can be constantly made in the second, third, fifth, sixth, eighth, ninth, eleventh and twelfth embodiments described above. In this case, even when the resistance of the monitoring resistor part (21 or 21A) changes due to a temperature change or the like and the voltage (V1 or V1A) input to the comparator circuit (24 or 24A) changes, it is possible to control the terminating resistor part at an appropriate timing to follow the temperature change or the like because the calibration can be constantly made.

Figure 43:
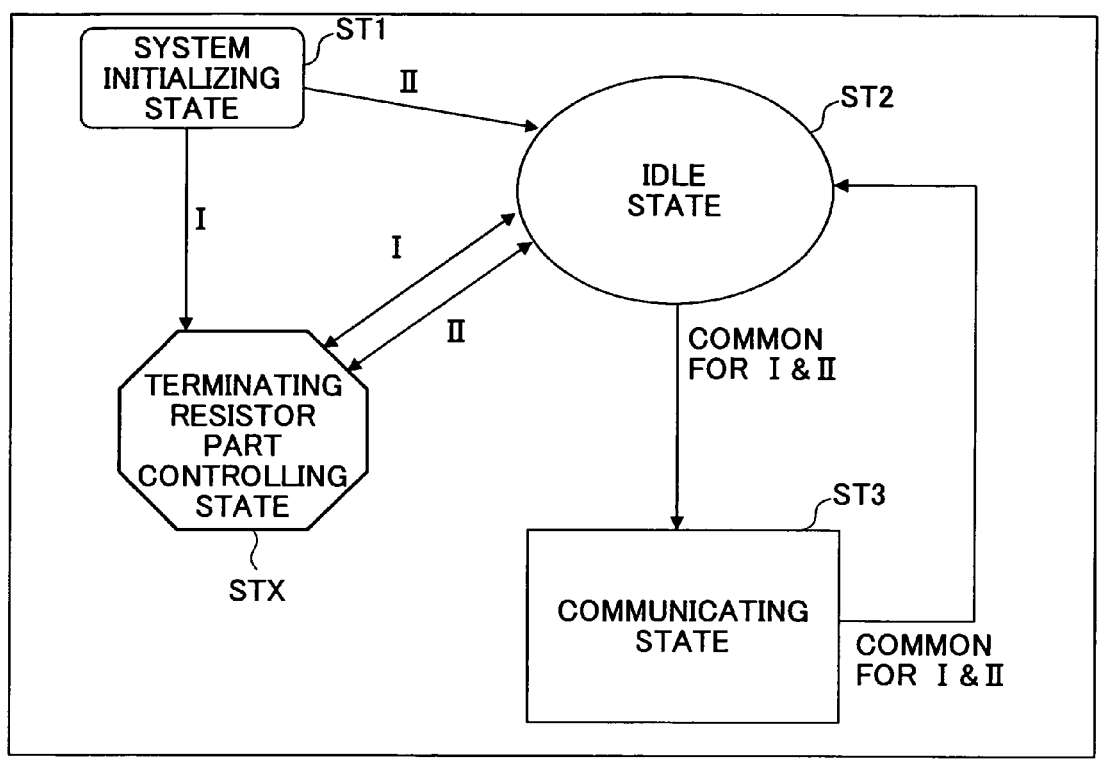
FIG. 43 is a state transition diagram of the semiconductor device for explaining resistance control timings of a terminating resistor part.

In each of the first through twelfth embodiments described above, the control timing of the terminating resistor part is independent of the circuit structure of the semiconductor integrated circuit, and the optimum resistance is reflected to the terminating resistor part in (I) the system initializing state or (II) the idle state. FIG. 43 is a state transition diagram of the semiconductor device for explaining resistance control timings of the terminating resistor part. As shown in FIG. 43, the semiconductor device can make a transition from a system initializing state ST1 to a terminating resistor part controlling state STX as indicated by I, and can make a transition from an idle state ST2 to the terminating resistor part controlling state STX as indicated by II, but cannot make a transition from a communicating state ST3 to the terminating resistor part controlling state STX.

[Modification]

In the first through sixth embodiments described above, the monitoring resistor part 21 has seven resistors R1, and one resistor R1 is fixedly connected between the node N1 and the ground power supply voltage. However, the one resistor R1 that is fixedly connected may have a resistance that is different from the resistance of the remaining six resistors R1. In addition, the number of resistors R1 that are fixedly connected between the node N1 and the ground power supply voltage is not limited to one, and may be two or more. For example, it is possible to fixedly connect two resistors R1 having mutually different resistances between the node N1 and the ground power supply voltage. In such cases, the terminating resistor part 25 may of course be constructed similarly to the monitoring resistor part 25.

Furthermore, in the seventh through twelfth embodiments described above, the monitoring resistor part 21A has seven resistors R1, and one resistor R1 is fixedly connected between the node N1A and the power supply voltage VDD. However, the one resistor R1 that is fixedly connected may have a resistance that is different from the resistance of the remaining six resistors R1. In addition, the number of resistors R1 that are fixedly connected between the node N1A and the power supply voltage VDD is not limited to one, and may be two or more. For example, it is possible to fixedly connect two resistors R1 having mutually different resistances between the node N1A and the power supply voltage VDD. In such cases, the terminating resistor part 25A may of course be constructed similarly to the monitoring resistor part 25A.

Figure 44:
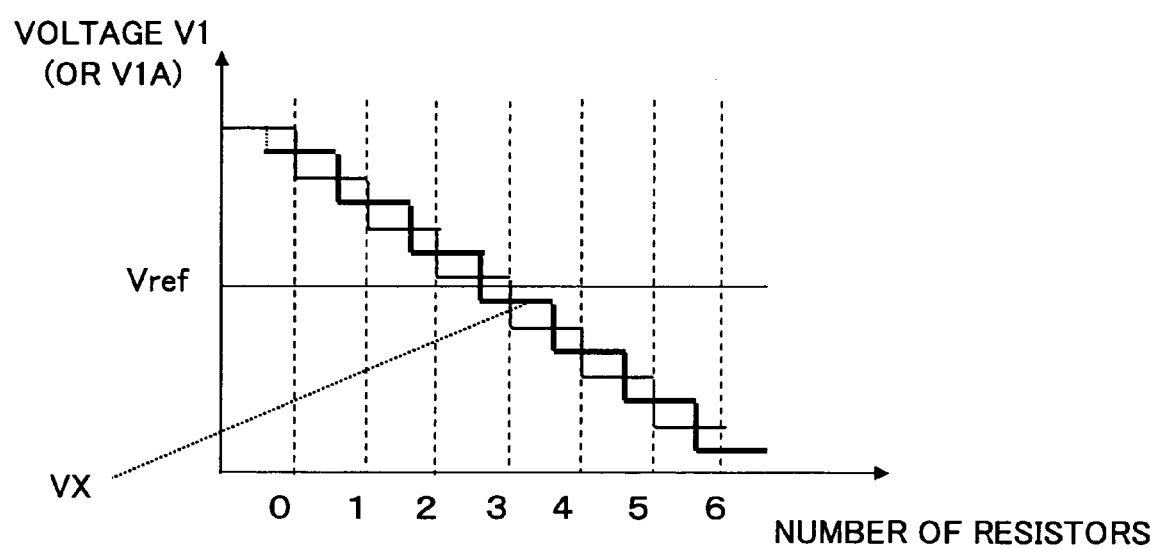
FIG. 44 is a diagram for explaining a fine adjustment of the resistance.

FIG. 44 is a diagram for explaining a fine adjustment of the resistance. In FIG. 44, the ordinate indicates the voltage V1 (or V1A) at the node N1 (or N1A) in arbitrary units, and the abscissa indicates the number of resistors R1 that are selectively connected in the monitoring resistor part 21 (or 21A).

Depending on the setting of the resistors R1 and R2 that are selectively connected in the monitoring resistor part 21 (or 21A) and the terminating resistor part 25 (or 25A), a control unit (changing step) of the voltage V1 (or V1A) may not be sufficiently small. In such a case, the number of resistors R1 that are fixedly connected may be set to two, with one of the two resistors R1 having the same resistance as the remaining resistors R1 that are selectively connected and the other of the two resistors R1 having a resistance that is M times the resistance of the remaining resistors R1, where M is an integer greater than or equal to two.

Figure 45:
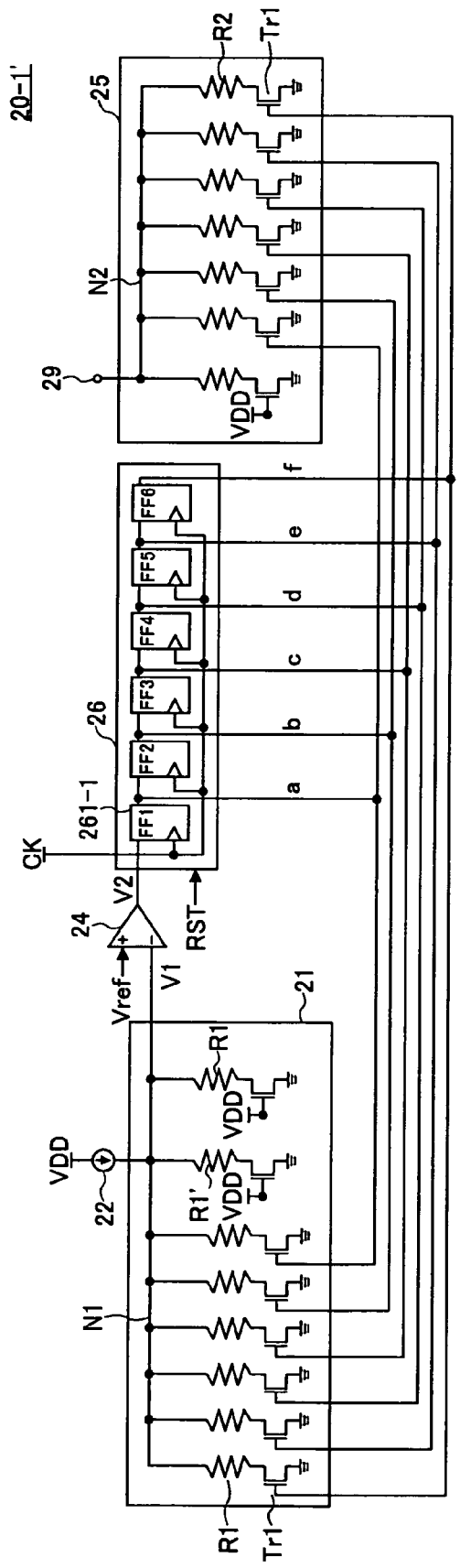
FIG. 45 is a diagram showing a modification of the semiconductor device according to the present invention.

FIG. 45 is a diagram showing a modification of the semiconductor device according to the present invention. FIG. 45 shows a case where this modification is applied to the first embodiment described above, as one example of the application. In FIG. 45, those parts that are the same as those corresponding parts in FIG. 3 are designated by the same reference numerals, and a description thereof will be omitted. In a semiconductor device 20-1' shown in FIG. 45, one resistor R1 and one resistor R1' are fixedly connected between the node N1 and the ground power supply voltage. Of the resistors R1 and R1' that are fixedly connected, the resistor R1 has the same resistance as the remaining resistors R1 that are selectively connected, and the resistor R1' has a resistance that is two times that of the remaining resistors R1 that are selectively connected, for example. In other words, R1'=2×R1. Of course, the terminating resistor part 25 may be constructed similarly to the monitoring resistor part 21, instead of being constructed as shown in FIG. 45.

In FIG. 44, a thin solid line indicates the case where only one resistor R1 is fixedly connected (as shown in FIG. 3, for example), and a bold solid line indicates the case where two resistors R1 and R1' having mutually different resistances are fixedly connected (as shown in FIG. 45, for example). In addition, VX indicates a position where the output signal V2 (or V2A) of the comparator circuit 24 (or 24A) indicates that the voltage V1 (or V1A) is equal to the reference voltage Vref.

Accordingly, by appropriately setting the number of resistors R1 that are fixedly connected and the resistances of the resistors R1 that are fixedly connected, it is possible to finely adjust the resistance of the monitoring resistor part 21 (or 21A). By reflecting the optimum resistance that is obtained by making the calibration using such a monitoring resistor part 21 (or 21A) to the terminating resistor part 25 (or 25A), it becomes possible to finely adjust the resistance of the terminating resistor part 25 (or 25A).

This application claims the benefit of a Japanese Patent Application No. 2006-076776 filed Mar. 20, 2006, in the Japanese Patent Office, the disclosure of which is hereby incorporated by reference.

Further, the present invention is not limited to these embodiments, but various variations and modifications may be made without departing from the scope of the present invention.

What is claimed is:

1. A semiconductor integrated circuit comprising:
   a current source circuit coupled between a first node and a first voltage, said first voltage being one of a power supply voltage and a ground voltage;
   a monitoring resistor part having a plurality of first resistors that are selectively coupled in parallel between the first node and a second voltage said second voltage being the other of the power supply voltage and the ground voltage;
   a terminating resistor part having a plurality of second resistors that are selectively coupled in parallel between a second node and the second voltage;
   a comparator circuit configured to compare a voltage of the first node and a reference voltage and to output a comparison result;
   a control part, including a shift register part receiving the comparison result from the comparator circuit, configured to control the first resistors that are selectively coupled in parallel in the monitoring resistor part by an output of the shift register part in response to the comparison result when making a calibration; and
   an external terminal coupled to the second node,
   wherein the control part selectively couples the second resistors in parallel in the terminating resistor part similarly to the first resistors of the monitoring resistor part in response to the comparison result when controlling a resistance of the terminating resistor part, and
   wherein the control part includes a timing control part configured to output the output of the shift register part to the terminating resistor part in response to an external signal, and the output of the shift register part is constantly output to the monitoring resistor part.

2. The semiconductor integrated circuit as claimed in claim 1, wherein the output of the shift register part controls selective connection of the first resistors of the monitoring resistor part and selective connection of the second resistors of the terminating resistor part.

3. The semiconductor integrated circuit as claimed in claim 2, wherein:
   the calibration is made in an initializing state or an idle state;
   power is input to the semiconductor integrated circuit or a state is restored from a power downstate in the initializing state;
   no communicating operation is made in the idle state; and
   the resistance of the terminating resistor part is made in either the initializing state or the idle state.

4. The semiconductor integrated circuit as claimed in claim 1, wherein:
   the calibration is made in any of an initializing state, an idle state and a communicating state;
   power is input to the semiconductor integrated circuit or a state is restored from a power downstate in the initializing state;
   no communicating operation is made in the idle state;
   communication is made in the communicating state; and
   the resistance of the terminating resistor part is made in either the initializing state or the idle state.

5. The semiconductor integrated circuit as claimed in claim 1, wherein the shift register part comprises a predetermined number of flip-flops coupled in series and operating in response to a single clock signal, and the predetermined number is equal to a number of first resistors that are selectively connectable in the monitoring resistor part.

6. The semiconductor integrated circuit as claimed in claim 1, wherein the shift register part comprises a predetermined number of flip-flops coupled in series and operating in response to a number of clock signals having mutually different phases, and the predetermined number is equal to both a number of first resistors that are selectively connectable in the monitoring resistor part and to the number of clock signals.

7. The semiconductor integrated circuit as claimed in claim 1, wherein the monitoring resistor part and the terminating resistor part have identical structures.

8. The semiconductor integrated circuit as claimed in claim 7, wherein at least one of the first resistors has a resistance that is N times a resistance of the second resistors, where N is an integer.

9. The semiconductor integrated circuit as claimed in claim 1, wherein at least one of the first resistors of the monitoring resistor part is fixedly coupled between the first node and the second voltage, and at least one of the second resistors of the terminating resistor part is fixedly coupled between the second node and the second voltage.

10. The semiconductor integrated circuit as claimed in claim 1, wherein at least two of the first resistors of the monitoring resistor part are fixedly coupled between the first node and the second voltage, one of the two first resistors has a resistance identical to that of remaining first resistors that are selectively coupled in parallel, and the other of the two first resistors has a resistance that is M times that of the remaining first resistors, where M is an integer greater than or equal to two.

11. The semiconductor integrated circuit as claimed in claim 1, further comprising:
    a driver having an output coupled to the external terminal; and
    a receiver having an input coupled to the external terminal.

12. A semiconductor device comprising:
    a semiconductor integrated circuit as claimed in claim 1.

13. A terminal resistance adjusting method for adjusting a terminating resistance within a semiconductor integrated circuit, comprising:
    a comparing step obtaining a comparison result by comparing a reference voltage and a voltage of a first node that is coupled to a first voltage via a current supply circuit by a comparator circuit within the semiconductor integrated circuit, said first voltage being one of a power supply voltage and a ground voltage;
    a first control step controlling a monitoring resistor part which has a plurality of first resistors when making a calibration, so as to selectively couple the first resistors in parallel between the first node and a second voltage by an output of a shift register part within the semiconductor integrated circuit in response to the comparison result which is supplied to the shift register part, said second voltage being the other of the power supply voltage and the ground voltage; and
    a second control step controlling a terminating resistor part which has a plurality of second resistors when controlling the terminating resistance of the terminating part, so as to selectively couple the second resistors in parallel between a second node and the second voltage by the output of said shift register part in response to the comparison result similarly to the first resistors of the monitoring resistor part,
    wherein a timing control part is controlled to output the output of the shift register part to the terminating resistor part in response to an external signal, and the output of the shift register part is constantly output to the monitoring resistor part.

14. The terminating resistance adjusting method as claimed in claim 13, wherein:
the first control step is carried out in an initializing state or an idle state;
power is input to the semiconductor integrated circuit or a state is restored from a power downstate in the initializing state;
no communicating operation is made by the semiconductor integrated circuit in the idle state; and
the second control step is carried out in either the initializing state or the idle state.

15. The terminating resistance adjusting method as claimed in claim 13, wherein:
the first control step is carried out in any of an initializing state, an idle state and a communicating state;
power is input to the semiconductor integrated circuit or a state is restored from a power downstate in the initializing state;
no communicating operation is made by the semiconductor integrated circuit in the idle state;
communication is made by the semiconductor integrated circuit in the communicating state; and
the second control step is carried out in either the initializing state or the idle state.

16. The terminating resistance adjusting method as claimed in claim 13, wherein at least one of the first resistors of the monitoring resistor part is fixedly coupled between the first node and the second voltage, and at least one of the second resistors of the terminating resistor part is fixedly coupled between the second node and the second voltage.

17. The terminating resistance adjusting method as claimed in claim 13, wherein at least two of the first resistors of the monitoring resistor part are fixedly coupled between the first node and the second voltage, one of the two first resistors has a resistance identical to that of remaining first resistors that are selectively coupled in parallel, and the other of the two first resistors has a resistance that is M times that of the remaining first resistors, where M is an integer greater than or equal to two.

18. The terminating resistance adjusting method as claimed in claim 13, wherein the monitoring resistor part and the terminating resistor part have identical structures.

19. The terminating resistance adjusting method as claimed in claim 18, wherein at least one of the first resistors has a resistance that is N times a resistance of the second resistors, where N is an integer.

\* \* \* \* \*